(12) United States Patent
Fujii et al.

(10) Patent No.: US 10,205,402 B2
(45) Date of Patent: Feb. 12, 2019

(54) POWER CONVERSION DEVICE FOR CONVERTING POWER BETWEEN A DC CIRCUIT AND AN AC CIRCUIT BY PERFORMING A NON-LINEAR OPERATION

(71) Applicant: MITSUBISHI ELECTRIC CORPORATION, Chiyoda-ku, Tokyo (JP)

(72) Inventors: Toshiyuki Fujii, Tokyo (JP); Takushi Jimichi, Tokyo (JP); Ryosuke Uda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/759,151

(22) PCT Filed: Sep. 17, 2015

(86) PCT No.: PCT/JP2015/076431
§ 371 (c)(1),
(2) Date: Mar. 9, 2018

(87) PCT Pub. No.: WO2017/046909
PCT Pub. Date: Mar. 23, 2017

(65) Prior Publication Data
US 2018/0287509 A1 Oct. 4, 2018

(51) Int. Cl.
*H02M 7/48* (2007.01)
*H02M 7/483* (2007.01)
*H02M 7/5387* (2007.01)

(52) U.S. Cl.
CPC ......... *H02M 7/483* (2013.01); *H02M 7/5387* (2013.01)

(58) Field of Classification Search
CPC ................. H02M 7/217; H02M 7/219; H02M 2001/0003
See application file for complete search history.

(56) References Cited

U.S. PATENT DOCUMENTS 5,065,304 A * 11/1991 Tamai ............... H02M 7/53875
363/95
6,242,895 B1 * 6/2001 Fujii ........................ G05F 1/70
323/207

(Continued)

FOREIGN PATENT DOCUMENTS

EP        2 486 645 A1    8/2012
JP       2012-531878 A   12/2012
(Continued)

OTHER PUBLICATIONS

International Search Report (PCT/ISA/210) dated Dec. 22, 2015, by the Japan Patent Office as the International Searching Authority for International Application No. PCT/JP2015/076431.

(Continued)

*Primary Examiner* — Yusef A Ahmed
(74) *Attorney, Agent, or Firm* — Buchanan Ingersoll & Rooney PC

(57) ABSTRACT

In a control device of a power conversion device, an AC control portion generates a first voltage command value representing an AC voltage component to be output from a plurality of chopper cells of each leg circuit. A DC control portion generates a second voltage command value representing a DC voltage component to be output from the plurality of chopper cells of each leg circuit. A circulating current control portion generates a third voltage command value to be output from the plurality of chopper cells of each leg circuit in order to suppress a circulating current. The circulating current control portion performs a non-linear operation with the first, second, and third voltage command (Continued)

values. The plurality of chopper cells of each leg circuit operate in accordance with a result of the non-linear operation.

10 Claims, 16 Drawing Sheets

(56) References Cited

U.S. PATENT DOCUMENTS

| | | | |
|---|---|---|---|
| 2009/0244937 A1* | 10/2009 | Liu | H02M 1/4216 363/46 |
| 2010/0118578 A1 | 5/2010 | Dommaschk et al. | |
| 2011/0280049 A1* | 11/2011 | Mori | H02M 1/4216 363/25 |
| 2012/0195084 A1 | 8/2012 | Norrga | |
| 2013/0155732 A1* | 6/2013 | Wagoner | H02J 3/01 363/40 |
| 2015/0236603 A1* | 8/2015 | Jimichi | H02M 5/293 363/37 |
| 2016/0056727 A1* | 2/2016 | Mukunoki | H02M 7/483 363/68 |
| 2016/0329831 A1* | 11/2016 | Mukunoki | H02M 7/483 |
| 2016/0336874 A1* | 11/2016 | Kikuchi | H02M 7/483 |
| 2017/0047860 A1* | 2/2017 | Fujii | H02M 7/483 |
| 2017/0214334 A1* | 7/2017 | Mukunoki | H02M 1/12 |
| 2018/0069488 A1* | 3/2018 | Mukunoki | H02M 7/48 |
| 2018/0159422 A1* | 6/2018 | Kikuchi | H02M 7/12 |

FOREIGN PATENT DOCUMENTS

| | | |
|---|---|---|
| JP | 2013-507100 A | 2/2013 |
| JP | 5189105 B2 | 4/2013 |
| WO | 2011/042050 A1 | 4/2011 |
| WO | 2014/133026 A1 | 9/2014 |
| WO | 2014/162620 A1 | 10/2014 |

OTHER PUBLICATIONS

Written Opinion (PCT/ISA/237) dated Dec. 22, 2015, by the Japan Patent Office as the International Searching Authority for International Application No. PCT/JP2015/076431.
International Search Report (PCT/ISA/210) dated Dec. 22, 2015, by the Japanese Patent Office as the International Searching Authority for International Application No. PCT/JP2015/076430. (5 pages).
Written Opinion (PCT/ISA/237) dated Dec. 22, 2015, by the Japanese Patent Office as the International Searching Authority for International Application No. PCT/JP2015/076430. (5 pages).
International Search Report (PCT/ISA/210) dated Dec. 22, 2015, by the Japanese Patent Office as the International Searching Authority for International Application No. PCT/JP2015/076432. (5 pages).
Written Opinion (PCT/ISA/237) dated Dec. 22, 2015, by the Japanese Patent Office as the International Searching Authority for International Application No. PCT/JP2015/076432. (4 pages).
Extended European Search Report dated Aug. 10, 2018, issued by the European Patent Office in European Application No. 15904097.1. (7 pages).
Extended European Search Report dated Sep. 17, 2018, issued by the European Patent Office in European Application No. 15904099.7. (8 pages).
Office Action (Notification of Reasons for Refusal) dated Nov. 27, 2018, by the Japan Patent Office in Japanese Patent Application No. 2017-540408 and English translation of the Office Action. (13 pages).

* cited by examiner

POWER CONVERSION DEVICE FOR CONVERTING POWER BETWEEN A DC CIRCUIT AND AN AC CIRCUIT BY PERFORMING A NON-LINEAR OPERATION

TECHNICAL FIELD

This invention relates to a power conversion device which converts power between an alternating current (AC) and a direct current (DC) and is suitably used, for example, in a power conversion device of a large capacity installed in a power system.

BACKGROUND ART

In a power conversion device of a large capacity installed in a power system, an output from a converter has a high voltage or a high current and hence the power conversion device is often configured with a plurality of converters being multiplexed in series or in parallel. By multiplexing converters, not only an effect of increase in capacity of the converter but also an effect of lowering in harmonics contained in a waveform of an output voltage as a result of combination of output voltages from the converters and resultant lowering in harmonic current which flows out to the power system can be achieved.

Examples of the power conversion device including multiplexed converters include a multilevel converter in which output terminals of a plurality of converters are cascaded. A modular multilevel converter (MMC) represents one of the multilevel converters. The modular multilevel converter includes a first arm connected to a DC terminal on a positive-electrode side and a second arm connected to a DC terminal on a negative-electrode side for each phase of an alternating current and each arm is configured with a plurality of converter cells (which are also referred to as chopper cells) being cascaded. The first arm and the second arm of each phase implement a leg. Each leg is provided with at least one reactor.

In the modular multilevel converter, a circulating current which circulates through a plurality of legs without flowing to the outside may flow and the circulating current should be controlled to 0 or a prescribed value. Techniques described, for example, in Japanese Patent No. 5189105 (PTD 1) and Japanese National Patent Publication No. 2012-531878 (PTD 2) have been known as the conventional techniques for control of a circulating current.

Japanese Patent No. 5189105 (PTD 1) discloses a multilevel converter having one control unit for controlling and lowering a circulating current for each arm (a phase module branch). Each control unit is given a branch voltage target value from a current control unit. In particular, this document discloses combination by the current control unit of a circulating voltage target value with another target value of a phase module branch as an add-on, that is, in a linear manner, (in a form of a sum or a difference) in order to generate a branch voltage target value.

Japanese National Patent Publication No. 2012-531878 (PTD 2) discloses connection of a harmonic compensator of an active control type to a reactor (an inductor) provided in a leg of each phase in order to control a circulating current. This harmonic compensator is configured to suppress a harmonic component higher in frequency than a fundamental component contained in a circulating current.

CITATION LIST

Patent Document

PTD 1: Japanese Patent No. 5189105
PTD 2: Japanese National Patent Publication No. 2012-531878

SUMMARY OF INVENTION

Technical Problem

More specifically, the power conversion device described in Japanese Patent No. 5189105 (PTD 1) combines a voltage command value for control of an electric quantity (a voltage and a current) of an AC terminal, a voltage command value for control of an electric quantity (a voltage and a current) of a DC terminal, and a voltage command value for control of a circulating current which circulates in the power conversion device with one another. Then, the combined voltage command value is provided to all converter cells (chopper cells).

An upper limit and a lower limit of a voltage value which can be output by each converter cell are determined by a voltage value of a capacitor of each converter cell and a circuit configuration of each converter cell. Therefore, each converter cell cannot output a voltage exceeding the determined upper limit and lower limit. Therefore, for example, increase or decrease in voltage command value for control of electric quantities of an AC terminal and a DC terminal may restrict a voltage command value for control of a circulating current combined with these voltage command values. In this case, a voltage command value for suppressing a circulating current is not reflected on an output voltage from the converter cell. In contrast, under the influence by the voltage command value for control of a circulating current, a voltage command value for control of electric quantities of the AC terminal and the DC terminal is restricted, and consequently AC-DC conversion is not ideally achieved.

The power conversion device described in Japanese National Patent Publication No. 2012-531878 (PTD 2) is configured such that the harmonic compensator of the active control type connected to each reactor (inductor) suppresses a harmonic component higher in frequency than the fundamental component contained in the circulating current. The reactor, however, has such a characteristic that a current is more likely to flow as a frequency is lower (an admittance increases as a frequency is lower), and hence a DC current component and a fundamental component contained in the circulating current cannot be suppressed.

This invention was made in consideration of the problems described above and an object thereof is to provide a power conversion device capable of reliably controlling an AC electric quantity (an AC voltage and an AC current), a DC electric quantity (a DC voltage and a DC current), and a circulating current.

Solution to Problem

A power conversion device is connected between a DC circuit and an AC circuit and converts power between these circuits, and the power conversion device includes a plurality of leg circuits and a control device. The plurality of leg circuits correspond to respective phases of the AC circuit and are connected in parallel between common first and second DC terminals. Each leg circuit includes a plurality of chopper cells cascaded to one another and each including an energy storage and at least one inductor connected in series to the plurality of chopper cells. The control device controls operations of the plurality of chopper cells. The control device includes an AC control portion, a DC control portion, and a circulating current control portion. The AC control portion generates a first voltage command value representing an AC voltage component to be output from the plurality of chopper cells for each leg circuit based on an AC current and an AC voltage of the AC circuit. The DC control portion generates a second voltage command value representing a DC voltage component to be output from the plurality of chopper cells for each leg circuit based on a DC current and a DC voltage of the DC circuit. The circulating current control portion generates a third voltage command value representing a voltage to be output from the plurality of chopper cells in order to suppress a circulating current for each leg circuit based on the circulating current which circulates through each leg circuit. The circulating current control portion performs a non-linear operation with the first, second, and third voltage command values. The plurality of chopper cells of each leg circuit operate in accordance with a result of the non-linear operation.

Advantageous Effects of Invention

According to this invention, a plurality of chopper cells of each leg circuit operate in accordance with a result of a non-linear operation of a first voltage command value representing an AC voltage component to be output from the plurality of chopper cells, a second voltage command value representing a DC voltage component to be output from the plurality of chopper cells, and a third voltage command value representing a voltage to be output from the plurality of chopper cells in order to suppress a circulating current. Consequently, control of a circulating current and control of electric quantities of an AC terminal and a DC terminal can both be achieved without interference therebetween.

DESCRIPTION OF EMBODIMENTS

Figure 1:
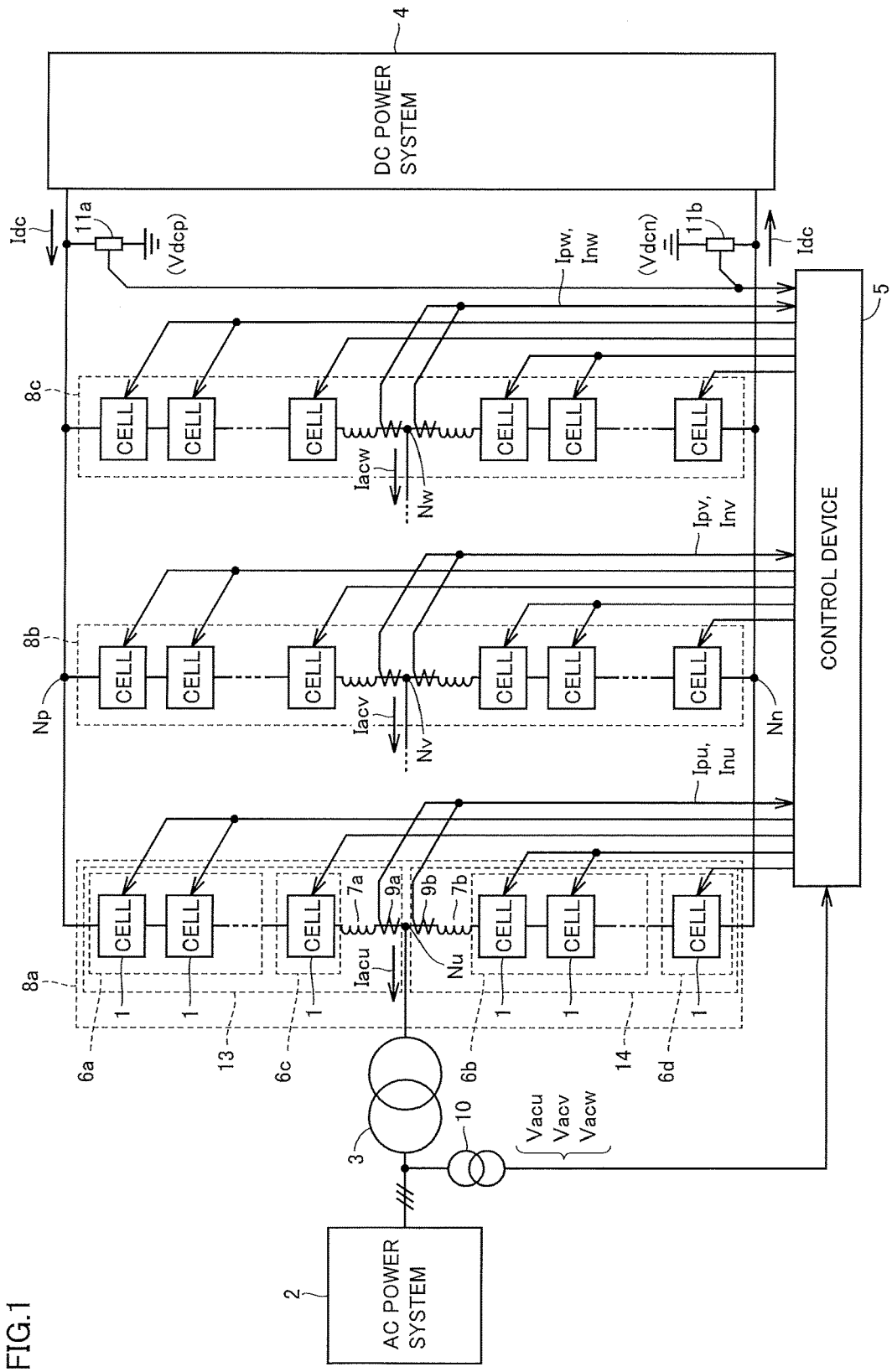
FIG. 1 is a schematic configuration diagram of a power conversion device according to a first embodiment.

Each embodiment will be described below in detail with reference to the drawings. The same or corresponding elements have the same reference characters allotted and description thereof will not be repeated.

First Embodiment

[Schematic Configuration of Power Conversion Device]

FIG. 1 is a schematic configuration diagram of a power conversion device according to a first embodiment. Referring to FIG. 1, the power conversion device includes leg circuits 8a, 8b, and 8c which are main circuits (which are denoted as a leg circuit 8 when they are collectively referred to or an unspecified one is referred to) and a control device 5 which controls these leg circuits 8.

Leg circuit 8 is provided for each of a plurality of phases implementing an alternating current and converts power between an alternating current and a direct current. FIG. 1 shows an example of a three-phase alternating current, and three leg circuits 8a, 8b, and 8c corresponding to a u phase, a v phase, and a w phase, respectively, are provided.

AC terminals Nu, Nv, and Nw provided in respective leg circuits 8a, 8b, and 8c are connected to AC circuit 2 with an interconnected transformer 3 being interposed. AC circuit 2 is, for example, an AC power system including an AC power supply. For facilitating illustration, FIG. 1 does not show connection of AC terminals Nv and Nw to interconnected transformer 3. DC terminals Np and Nn (a positive-side DC terminal Np and a negative-side DC terminal Nn) provided in common to leg circuits 8 are connected to DC circuit 4. DC circuit 4 is, for example, a DC power system and includes a DC power grid and another power conversion device which provides a DC output.

Instead of interconnected transformer 3 in FIG. 1, AC terminals Nu, Nv, and Nw may be connected to AC circuit 2 with an interconnected reactor being interposed. Instead of AC terminals Nu, Nv, and Nw, a primary winding may be provided in each of leg circuits 8a, 8b, and 8c, and leg circuits 8a, 8b, and 8c may be connected in an AC manner to interconnected transformer 3 or an interconnected reactor with a secondary winding magnetically coupled to the primary winding being interposed. In this case, the primary winding may be implemented by reactors 7a and 7b. Each of leg circuits 8a, 8b, and 8c is electrically (in a DC or AC manner) connected to AC circuit 2 with a connection portion provided in each of leg circuits 8a, 8b, and 8c being interposed, such as AC terminals Nu, Nv, and Nw or the above-described primary winding.

Leg circuit 8a is divided into a positive-side arm (which is also referred to as an upper arm or a primary arm) 13 from positive-side DC terminal Np to AC input terminal Nu and a negative-side arm (which is also referred to as a lower arm or a secondary arm) 14 from negative-side DC terminal Nn to AC input terminal Nu. A point of connection Nu between positive-side arm 13 and negative-side arm 14 is connected to transformer 3. Positive-side DC terminal Np and negative-side DC terminal Nn are connected to DC circuit 4. Since leg circuits 8b and 8c are also similarly configured, leg circuit 8a will be described below as a representative.

Positive-side arm 13 includes a cell group 6a in which a plurality of converter cells (chopper cells) 1 are cascaded, a cell group 6c in which a plurality of converter cells 1 are cascaded, and reactor 7a. Cell groups 6a and 6c and reactor 7a are connected in series to one another. For the sake of brevity, a converter cell (chopper cell) may be referred to as a cell below. Though FIG. 1 shows only a single cell 1 in cell group 6c for facilitating illustration, a plurality of cells 1 are actually cascaded.

Similarly, negative-side arm 14 includes a cell group 6b in which a plurality of cells 1 are cascaded, a cell group 6d in which a plurality of cells 1 are cascaded, and reactor 7b. Cell groups 6b and 6d and reactor 7b are connected in series to one another. Though FIG. 1 shows only a single cell 1 in cell group 6d for facilitating illustration, a plurality of cells 1 are actually cascaded.

Reactor 7a may be inserted in any position in positive-side arm 13 of leg circuit 8a, and reactor 7b may be inserted in any position in negative-side arm 14 of leg circuit 8a. A plurality of reactors 7a and a plurality of reactors 7b may be provided. The reactors may be different in inductance value. Only reactor 7a of positive-side arm 13 or only reactor 7b of negative-side arm 14 may be provided.

Cell groups 6a and 6c provided in positive-side arm 13 are referred to as a positive-side cell group and cell groups 6b and 6d provided in negative-side arm 14 are referred to as a negative-side cell group. As will be described in detail below, positive-side cell group 6a and negative-side cell group 6b are not used for control of a circulating current but are used only for control of an AC electric quantity and a DC electric quantity. Positive-side cell group 6c and negative-side cell group 6d are used for control of a circulating current. Control of a circulating current is characterized in that only at least one cell constituting each leg circuit 8 is used therefor.

The power conversion device in FIG. 1 further includes an AC voltage detector 10, DC voltage detectors 11a and 11b, and arm current detectors 9a and 9b provided in each leg circuit 8 as detectors which measure electric quantities (a current and a voltage) used for control. Signals detected by these detectors are input to control device 5.

Specifically, AC voltage detector 10 detects a U-phase voltage value Vacu, a V-phase voltage value Vacv, and a W-phase voltage value Vacw of AC circuit 2. DC voltage detector 11a detects a voltage of positive-side DC terminal Np connected to DC circuit 4. DC voltage detector 11b detects a voltage of negative-side DC terminal Nn connected to DC circuit 4. Arm current detectors 9a and 9b provided in leg circuit 8a for the U phase detect an arm current Ipu which flows in positive-side arm 13 and an arm current Inu which flows in negative-side arm 14, respectively. Similarly, arm current detectors 9a and 9b provided in leg circuit 8b for the V phase detect a positive-side arm current Ipv and a negative-side arm current Inv, respectively. Arm current detectors 9a and 9b provided in leg circuit 8c for the W phase detect a positive-side arm current Ipw and a negative-side arm current Inw, respectively. Arm currents Ipu, Inu, Ipv, Inv, Ipw, and Inw which flow from positive-side DC terminal Np toward negative-side DC terminal Nn are defined as positive currents.

[Configuration Example of Converter Cell]

Figure 2:
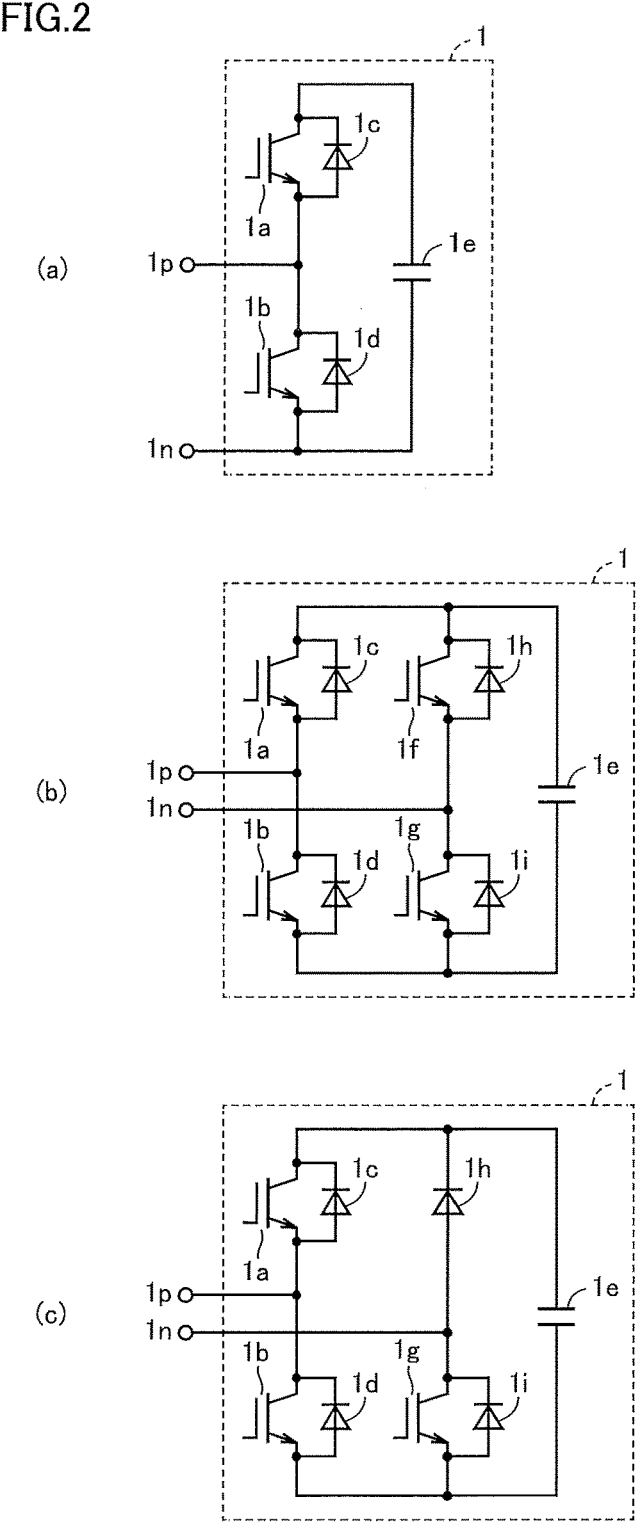
FIG. 2 is a circuit diagram showing one example of a converter cell constituting cell groups 6a, 6b, 6c, and 6d.

FIG. 2 is a circuit diagram showing one example of a converter cell constituting cell groups 6a, 6b, 6c, and 6d. Converter cell 1 shown in FIG. 2(a) adopts a half bridge configuration and includes semiconductor switching elements 1a and 1b (which may hereinafter simply be referred to as a switching element) connected in series to each other, diodes 1c and 1d, and a DC capacitor 1e. Diodes 1c and 1d are connected in anti-parallel (in parallel and in a direction of a reverse bias) to switching elements 1a and 1b, respectively. DC capacitor 1e is connected in parallel to a series connection circuit of switching elements 1a and 1b and smoothes a DC voltage. A connection node between switching elements 1a and 1b is connected to a positive-side input and output terminal 1p and a connection node between switching element 1b and DC capacitor 1e is connected to a negative-side input and output terminal 1n.

In the configuration in FIG. 2(a), switching elements 1a and 1b are controlled such that one is turned on and the other is turned off. When switching element 1a is turned on and switching element 1b is turned off, a voltage across opposing ends of DC capacitor 1e is applied across input and output terminals 1p and 1n (a positive-side voltage being applied to input and output terminal 1p and a negative-side voltage being applied to input and output terminal 1n). In contrast, when switching element 1a is turned off and switching element 1b is turned on, 0 V is applied across input and output terminals 1p and 1n. Converter cell 1 shown in FIG. 2(a) can output a zero voltage or a positive voltage (dependent on a voltage of DC capacitor 1e) by alternately turning on switching elements 1a and 1b. Diodes 1c and 1d are provided for protection when voltages in reverse directions are applied to switching elements 1a and 1b.

Converter cell 1 shown in FIG. 2(b) adopts a full bridge configuration and it is different from converter cell 1 in FIG. 2(a) in further including switching elements 1f and 1g connected in series and diodes 1h and 1i connected in anti-parallel to switching elements 1f and 1g. Switching elements 1f and 1g as a whole are connected in parallel to the series connection circuit of switching elements 1a and 1b and connected in parallel to DC capacitor 1e. Input and output terminal 1p is connected to the connection node between switching elements 1a and 1b and input and output terminal 1n is connected to a connection node between switching elements 1f and 1g.

Converter cell 1 shown in FIG. 2(b) is controlled such that switching element 1g is normally turned on, switching element 1f is normally turned off, and switching elements 1a and 1b are alternately turned on during a normal operation (that is, a zero voltage or a positive voltage is output across input and output terminals 1p and 1n). Converter cell 1 shown in FIG. 2(b), however, can also output a zero voltage or a negative voltage by turning off switching element 1g, turning on switching element 1f, and alternately turning on switching elements 1a and 1b.

Converter cell 1 shown in FIG. 2(c) is configured with switching element 1f having been removed from converter cell 1 of the full bridge configuration as shown in FIG. 2(b) and it is otherwise the same as in FIG. 2(b). Converter cell 1 in FIG. 2(c) is controlled such that switching element 1g is normally turned on and switching elements 1a and 1b are alternately turned on during the normal operation (that is, a zero voltage or a positive voltage is output across input and output terminals 1p and 1n). Converter cell 1 shown in FIG. 2(c) can output a negative voltage when switching elements 1a and 1g are turned off and switching element 1b is turned on so that a current flows from input and output terminal 1n toward input and output terminal 1p.

A self-turn-off switching element capable of control of both of an on operation and an off operation is employed for each of switching elements 1a, 1b, 1f, and 1g. For example, an insulated gate bipolar transistor (IGBT) or a gate commutated turn-off thyristor (GCT) is employed as switching elements 1a, 1b, 1f, and 1g.

[Configuration and General Operation of Control Device]

Figure 3:
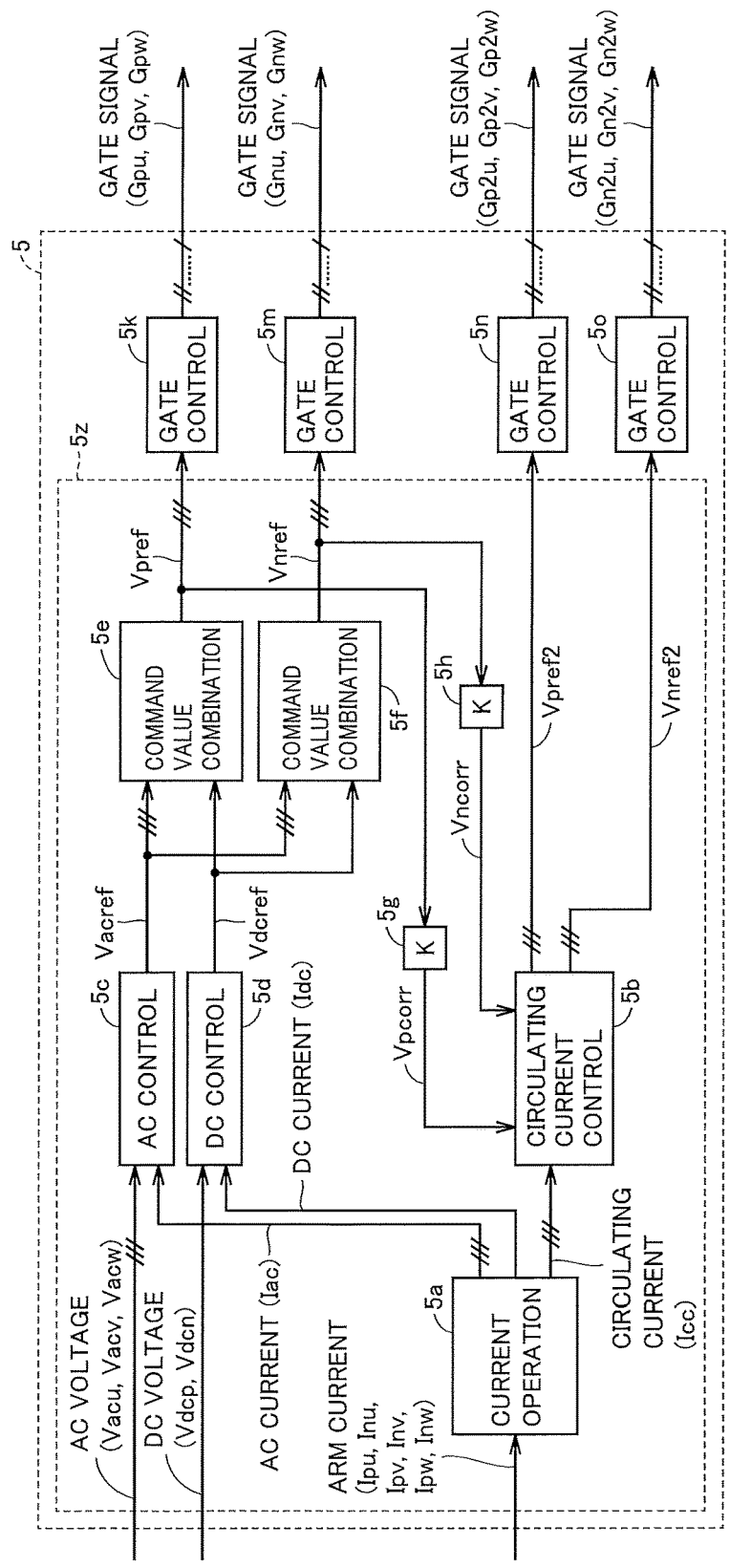
FIG. 3 is a configuration diagram of a control device 5 in FIG. 1.

FIG. 3 is a configuration diagram of control device 5 in FIG. 1. Control device 5 shown in FIG. 3 may be configured with a dedicated circuit or configured in part or in its entirety with a field programmable gate array (FPGA) and/or a microprocessor. A configuration of control device 5 and a general operation of each element will be described below with reference to FIGS. 1 and 3.

Control device 5 includes a voltage command value generation portion 5z and gate control portions 5k, 5m, 5n, and 5o. Gate control portion 5k supplies gate signals Gpu, Gpv, and Gpw to each switching element constituting positive-side cell group 6a of leg circuits 8a, 8b, and 8c, respectively. Gate control portion 5m supplies gate signals Gnu, Gnv, and Gnw to each switching element constituting negative-side cell group 6b of leg circuits 8a, 8b, and 8c, respectively. Gate control portion 5n supplies gate signals Gp2u, Gp2v, and Gp2w to each switching element constituting positive-side cell group 6c for control of a circulating current of leg circuits 8a, 8b, and 8c, respectively. Gate control portion 5o supplies gate signals Gn2u, Gn2v, and Gn2w to each switching element constituting negative-side cell group 6d for control of a circulating current of leg circuit 8a, 8b, and 8c, respectively.

Voltage command value generation portion 5z supplies voltage command values Vpref, Vnref, Vpref2, and Vnref2 to gate control portions 5k, 5m, 5n, and 5o, respectively. Voltage command values Vpref2 and Vnref2 supplied to respective gate control portions 5n and 5o for control of a circulating current are based on a detection value of a circulating current Icc. Voltage command values Vpref and Vnref supplied to other gate control portions 5k and 5m are not based on a detection value of circulating current Icc.

More specifically, voltage command value generation portion 5z includes a current operation portion 5a, a circulating current control portion 5b, an AC control portion 5c, a DC control portion 5d, command value combination portions 5e and 5f, and gain circuits 5g and 5h.

Current operation portion 5a takes in positive-side arm currents Ipu, Ipv, and Ipw detected by current detector 9a provided in positive-side arm 13 of leg circuit 8 of each phase and negative-side arm currents Inu, Inv, and Inw detected by current detector 9b provided in negative-side arm 14 of leg circuit 8 of each phase. Current operation portion 5a operates AC current values Iacu, Iacv, and Iacw, a DC current value Idc, and circulating current values Iccu, Iccv, and Iccw from the arm current which has been taken in. Current operation portion 5a outputs calculated AC current values Iacu, Iacv, and Iacw to AC control portion 5c, outputs calculated DC current value Idc to DC control portion 5d, and outputs calculated circulating current values Iccu, Iccv, and Iccw to circulating current control portion 5b.

U-phase AC current Iacu, V-phase AC current Iacv, and W-phase AC current Iacw (which are denoted as an AC current Iac when they are collectively referred to) which flow from AC terminals Nu, Nv, and Nw of each leg circuit 8 toward transformer 3 are defined as positive. DC current Idc which flows from DC circuit 4 toward positive-side DC terminal Np and from negative-side DC terminal Nn toward DC circuit 4 is defined as positive. Circulating currents Iccu, Iccv, and Iccw which flow through leg circuits 8a, 8b, and 8c, respectively (which are denoted as circulating current Icc when they are collectively referred to) from positive-side DC terminal Np toward negative-side DC terminal Nn are defined as positive.

AC voltage values Vacu, Vacv, and Vacw of the U phase, the V phase and the W phase (which are denoted as an AC voltage value Vac when they are collectively referred to) detected by AC voltage detector 10 are further input to AC control portion 5c. AC control portion 5c generates AC voltage command values Vacrefu, Vacrefv, and Vacrefw of the U phase, the V phase, and the W phase (which are denoted as an AC voltage command value Vacref when they are collectively referred to) based on input AC current value Iac and AC voltage value Vac. AC voltage command value Vacref represents an AC voltage component to be output from cell groups 6a and 6b.

DC voltage values Vdcp and Vdcn detected by DC voltage detectors 11a and 11b are further input to DC control portion 5d. DC control portion 5d generates a DC voltage command value Vdcref based on input DC voltage values Vdcp and Vdcn and DC current value Idc. DC voltage command value Vdcref represents a DC voltage component to be output from cell groups 6a and 6b.

Command value combination portion 5e generates a voltage command value Vprefu for U-phase positive-side cell group 6a by combining U-phase AC voltage command value Vacrefu and DC voltage command value Vdcref with each other. Similarly, command value combination portion 5e generates a voltage command value Vprefv for V-phase positive-side cell group 6a by combining V-phase AC voltage command value Vacrefv and DC voltage command value Vdcref with each other. Command value combination portion 5e further generates a voltage command value Vprefw for W-phase positive-side cell group 6a by combining W-phase AC voltage command value Vacrefw and DC voltage command value Vdcref with each other. Generated voltage command values Vprefu, Vprefv, and Vprefw (which are denoted as voltage command value Vpref when they are collectively referred to or an unspecified voltage command value is referred to) is input to gate control portion 5k.

Command value combination portion 5f generates a voltage command value Vnrefu for U-phase negative-side cell group 6b by combining U-phase AC voltage command value Vacrefu and DC voltage command value Vdcref with each other. Similarly, command value combination portion 5f generates a voltage command value Vnrefv for V-phase negative-side cell group 6b by combining V-phase AC voltage command value Vacrefv and DC voltage command value Vdcref with each other. Command value combination portion 5f further generates a voltage command value Vnrefw for W-phase negative-side cell group 6b by combining W-phase AC voltage command value Vacrefw and DC voltage command value Vdcref with each other. Generated voltage command values Vnrefu, Vnrefv, and Vnrefw (which are denoted as voltage command value Vnref when they are collectively referred to or an unspecified voltage command value is referred to) are input to gate control portion 5m.

Gain circuit 5g outputs a value calculated by multiplying voltage command value Vpref for positive-side cell group 6a of each phase by gain K to circulating current control portion 5b as a positive-side voltage correction value Vpcorr for control of a circulating current (Vpcorru for the U phase, Vpcorrv for the V phase, and Vpcorrw for the W phase). Gain circuit 5h outputs a value calculated by multiplying voltage command value Vnref for a negative-side cell group 6b of each phase by gain K to circulating current control portion 5b as a negative-side voltage correction value Vncorr for control of a circulating current (Vncorru for the U phase, Vncorrv for the V phase, and Vncorrw for the W phase).

Circulating current control portion 5b generates voltage command value Vpref2 for positive-side cell group 6c (Vpref2u for the U phase, Vpref2v for the V phase, and Vpref2w for the W phase) based on circulating current value Icc from current operation portion 5a and positive-side voltage correction value Vpcorr for each phase. Circulating current control portion 5b further generates voltage command value Vnref2 for negative-side cell group 6d (Vnref2u for the U phase, Vnref2v for the V phase, and Vnref2w for the W phase) based on circulating current value Icc from current operation portion 5a and negative-side voltage correction value Vncorr for each phase. Generated voltage command value Vpref2 is supplied to gate control portion 5n and generated voltage command value Vnref2 is supplied to gate control portion 5o.

[Overview of Configuration and Operation of Circulating Current Control Portion 5b]

Figure 4:
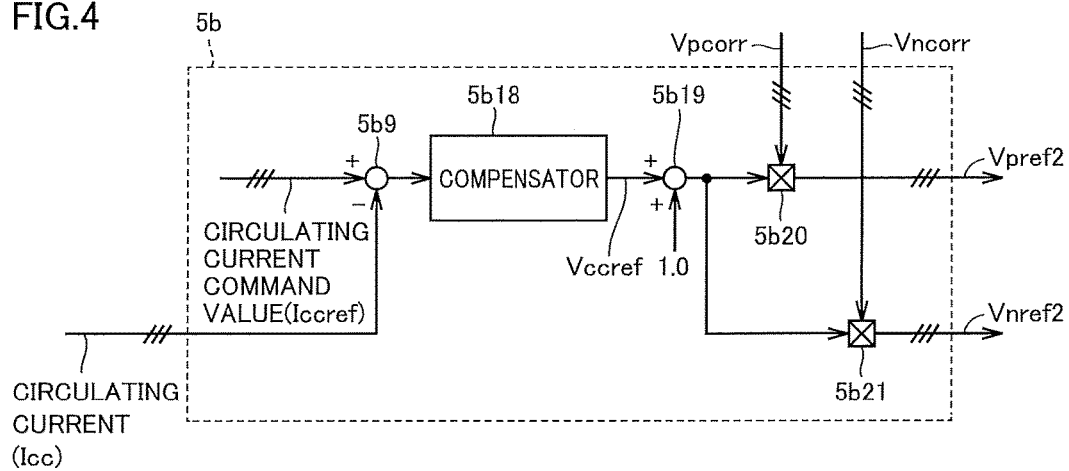
FIG. 4 is a detailed configuration diagram of a circulating current control portion 5b in FIG. 3.

FIG. 4 is a detailed configuration diagram of circulating current control portion 5b in FIG. 3. Referring to FIG. 4, circulating current control portion 5b includes a subtractor 5b9, a compensator 5b18, an adder 5b19, and multipliers 5b20 and 5b21.

Subtractor 5b9 calculates a difference between a circulating current command value Iccref (Iccrefu for the U phase, Iccrefv for the V phase, and Iccrefw for the W phase) and circulating current value Icc (Iccu of the U phase, Iccv of the V phase, and Iccw of the W phase) by subtracting the circulating current value from the circulating current command value. Compensator 5b18 generates voltage command value Vccref for control of a circulating current (Vccrefu for the U phase, Vccrefv for the V phase, and Vccrefw for the W phase) by amplifying the calculated difference. Though a zero current is normally provided as a circulating current command value, a non-zero value may also be provided when imbalance occurs in a power system.

Adder 5b19 adds a fixed value to the amplified difference (that is, voltage command value Vccref). Though the fixed value is set to 1.0 in FIG. 4, the fixed value is not limited to 1.0. Multiplier 5b20 generates voltage command value Vpref2 for positive-side cell group 6c by multiplying an output value from adder 5b19 (that is, Vccref+1) by positive-side voltage correction value Vpcorr for each phase. Multiplier 5b21 generates voltage command value Vnref2 for negative-side cell group 6d by multiplying an output value from adder 5b19 (Vccref+1) by negative-side voltage correction value Vncorr for each phase.

Circulating current control portion 5b thus generates voltage command values Vpref2 and Vnref2 for controlling cell groups 6c and 6d for control of a circulating current only through a non-linear operation of voltage command value Vccref based on circulating current Icc and voltage command values Vpref and Vnref which are based on AC current Iac and DC current Idc but are not based on circulating current Icc (or AC voltage command value Vacref and DC voltage command value Vdcref which serve as the basis) (that is, without through linear combination).

[Detailed Operation of Control Device 5]

A detailed operation of control device 5 will now be described.

(Operation of Current Operation Portion 5a)

Referring to FIG. 1, a point of connection between positive-side arm 13 and negative-side arm 14a of leg circuit 8a of the U phase is AC terminal Nu, which is connected to transformer 3. Therefore, AC current Iacu which flows from AC terminal Nu toward transformer 3 is equal to a current value calculated by subtracting a value of current Inu which flows through negative-side arm 14 measured with current detector 9b from a value of current Ipu which flows through positive-side arm 13 measured with current detector 9a, that is, $$Iacu = Ipu - Inu \quad (1).$$

An average value of current Ipu which flows through positive-side arm 13 and current Inu which flows through negative-side arm 14 is defined as a common current Icomu which flows through both of arms 13 and 14. Common current Icomu is a leg current which flows through a DC terminal of leg circuit 8a. Leg current Icomu can be operated as $$Icomu = (Ipu + Inu)/2 \quad (2).$$

Similarly for the V phase and the W phase, V-phase AC current Iacv and a V-phase leg current Icomv can be calculated with V-phase positive-side arm current Ipv and V-phase negative-side arm current Inv, and W-phase AC current Iacw and a W-phase leg current Icomw can be calculated with W-phase positive-side arm current Ipw and W-phase negative-side arm current Inw. Specifically, they are expressed in expressions below.

$$Iacv = Ipv - Inv \quad (3)$$

$$Icomv = (Ipv + Inv)/2 \quad (4)$$

$$Iacw = Ipw - Inw \quad (5)$$

$$Icomw = (Ipw + Inw)/2 \quad (6)$$

DC terminals on the positive side of leg circuits 8a, 8b, and 8c of respective phases are connected in common as positive-side DC terminal Np, and DC terminals on the negative side are connected in common as negative-side DC terminal Nn. According to this configuration, a current value calculated by adding leg currents Icomu, Icomv, and Icomw of respective phases results in DC current Idc which flows in from the positive-side terminal of DC circuit 4 and returns to DC circuit 4 through the negative-side terminal. Therefore, DC current Idc can be operated as $$Idc = Icomu + Icomv + Icomw \quad (7).$$

Uniform allocation of a DC current component contained in the leg current among the phases is appropriate because a current capacity of the cell can be uniform. Taking into account this fact, a difference between a leg current and ⅓ of a DC current value can be operated as a value of a circulating current which does not flow in DC circuit 4 but flows through the legs of the respective phases. Specifically, circulating currents Iccu, Iccv, and Iccw of the U phase, the V phase, and the W phase can be operated as $$Iccu = Icomu - Idc/3 \quad (8)$$

$$Iccv = Icomv - Idc/3 \quad (9)$$

$$Iccw = Icomw - Idc/3 \quad (10).$$

Current operation portion 5a in FIG. 3 operates AC current values Iacu, Iacv, and Iacw, DC current value Idc, and circulating current values Iccu, Iccv, and Iccw from arm current values Ipu, Inu, Ipv, Inv, Ipw, and Inw detected by current detectors 9a and 9b in accordance with the expressions (1), (3), (5), and (7) to (10). Current operation portion 5a outputs calculated AC current values Iacu, Iacv, and Iacw, DC current value Idc, and circulating current values Iccu, Iccv, and Iccw to AC control portion 5c, DC control portion 5d, and circulating current control portion 5b, respectively.

AC control portion 5c outputs an AC voltage to be output from cell 1 of the power conversion device as AC voltage command values Vacrefu, Vacrefv, and Vacrefw, based on AC voltage values Vacu, Vacv, and Vacw detected by AC voltage detector 10 and AC current values Iacu, Iacv, and Iacw output from current operation portion 5a. In AC control portion 5c, for example, AC current control which carries out feedback control such that an AC current value matches with an AC current command value or AC voltage control which provides feedback such that an AC voltage value matches with an AC voltage command value is configured in accordance with a function required in the power conversion device. Alternatively, power control which calculates power based on an AC current value and an AC voltage value and a power value attains to a desired value is implemented. One type or a plurality of types of such control as combined is/are implemented and operated. Since AC current control controls a current output to AC circuit 2 with transformer 3 being interposed, a voltage component for controlling the current is a component which has been known as a normal-phase component and a reverse-phase component of a multi-phase AC voltage or a normal mode component. AC voltage control also similarly outputs a normal-phase component and a reverse-phase component. When an AC multi-phase voltage is output, output of a voltage component in common among the three phases which is known as a zero-phase component or a common mode component in addition to these normal- and reverse-phase components is also required. For example, it has been known that an AC component of a fundamental wave which can be output from a converter cell can be increased by approximately 15% by superimposing a third-order harmonic of the fundamental wave on a zero-phase component. In the power conversion device configured in FIG. 1, as will be shown later as outputting a certain zero-phase component, AC voltage components output from cell groups 6a and 6b are opposite in polarity to each other. Therefore, a DC component of a voltage from cell group 6a of each phase configured at a positive electrode and a DC component of a voltage output from cell group 6b of each phase configured at a negative electrode are superimposed in a direction reverse in terms of positive and negative. Consequently, a difference between DC power output from the positive-side cell group and DC power from the negative-side cell group is produced, and therefore energy in DC capacitor 1e configured in converter cell 1 can be exchanged between the positive side and the negative side, which also contributes to control for balancing between voltage values of the DC capacitors of cell group 6a and cell group 6b.

(Operation of DC Control Portion 5d)

DC control portion 5d operates voltage value Vdc across DC terminals based on a differential voltage between DC voltage values Vdcp and Vdcn detected by DC voltage detectors 11a and 11b. Voltage value Vdc across the DC terminals is given as $$Vdc = Vdcp - Vdcn \quad (11).$$

DC control portion 5d generates as DC voltage command value Vdcref, a DC voltage to be output from cell 1 based on calculated voltage value Vdc across the DC terminals and DC current value Idc output from current operation portion 5a, and outputs the DC voltage command value.

DC control portion 5d is implemented, for example, by any one of a DC current controller which controls a DC current value, a DC voltage controller which controls a DC voltage, and a DC power controller which controls DC power, or a plurality of them as being combined for operation, similarly to AC control portion 5c. A DC voltage component output from positive-side cell group 6a and a DC voltage component output from negative-side cell group 6b in accordance with DC voltage command value Vdcref output from the DC voltage controller, the DC current controller, and the DC power controller are identical in polarity to each other as will be described later. Since cell groups 6a and 6b are connected in series, output voltages from cell groups 6a and 6b are combined and the combined voltage is defined as a voltage component generated across the positive-side DC terminal and the negative-side DC terminal of leg circuit 8. Since DC voltage command value Vdcref is provided to gate control portions 5k and 5m as a component common among the phases in the configuration of control device 5 shown in FIG. 3, the voltage components output from cell groups 6a and 6b in accordance with DC voltage command value Vdcref result in a DC voltage component output to DC circuit 4.

Unlike the above, DC control portion 5d can also be configured to provide DC voltage command values Vdcref different in magnitude among the phases. In that case, a DC voltage command value is provided such that a circulating current which circulates among the phases flows based on a potential difference produced in reactors 7a and 7b. When a circulating current flows in a DC manner, a difference is produced in DC power generated by leg circuits 8a, 8b, and 8c and consequently a difference in energy stored in DC capacitor 1e constituting cell groups 6a and 6b is also produced among the phases. This operation is applied to balance control for balancing among the phases in connection with a DC voltage of DC capacitor 1e.

(Operation of Command Value Combination Portions 5e and 5f)

Command value combination portion 5e operates a voltage to be output from positive-side cell group 6a as voltage command value Vpref (Vprefu, Vprefv, and Vprefw). Command value combination portion 5f operates a voltage to be output from negative-side cell group 6b as voltage command value Vnref (Vnrefu, Vnrefv, and Vnrefw). Voltage command values Vpref and Vnref are obtained by combining DC voltage command value Vdcref and AC voltage command value Vacref with each other for each phase.

Specifically, positive-side cell group 6a and negative-side cell group 6b are connected in series between DC terminals Np and Nn connected to DC circuit 4. Therefore, in calculating each of voltage command value Vpref of positive-side cell group 6a and voltage command value Vnref of negative-side cell group 6b, ½ of DC voltage command value Vdcref is combined by addition.

Since AC terminals Nu, Nv, and Nw are located at points of connection between positive-side arm 13 and negative-side arm 14, AC voltage command value Vacref is combined by subtraction in calculating voltage command value Vpref of positive-side cell group 6a, and AC voltage command value Vacref is combined by addition in calculating voltage command value Vnref of negative-side cell group 6b. For example, in leg circuit 8a in FIG. 1, when positive-side cell group 6a outputs an AC voltage relatively small in value and negative-side cell group 6b outputs an AC voltage relatively great in value, a potential of AC terminal Nu is closer to a potential of positive-side DC terminal Np and a high voltage is output to AC terminal Nu. Negative-side cell group 6b outputs an AC voltage identical in polarity to an AC voltage to be output from AC terminal Nu, and positive-side cell group 6a outputs an AC voltage opposite in polarity to an AC voltage to be output from AC terminal Nu.

In the power conversion device in the first embodiment, command value combination portions 5e and 5f combine normal- and reverse-phase components and a zero-phase component contained in AC voltage command value Vacref with DC voltage command value Vdcref through the operation above, however, they do not combine a voltage component with which energy is balanced among the phases by feeding a circulating current nor a voltage component with which a circulating current is controlled.

(Operation of Gate Control Portions 5k and 5m)

Gate control portion 5k provides corresponding gate signals Gpu, Gpv, and Gpw to the switching element of cell 1 constituting positive-side cell group 6a of each phase based on voltage command values Vprefu, Vprefv, and Vprefw of the U phase, the V phase, and the W phase combined by command value combination portion 5e. Gate control portion 5m provides corresponding gate signals Gnu, Gnv, and Gnw to the switching element of cell 1 constituting negative-side cell group 6b of each phase based on voltage command values Vnrefu, Vnrefv, and Vnrefw of the U phase, the V phase, and the W phase combined by command value combination portion 5f.

As described already, in half bridge cell 1 shown in FIG. 2(a), switching element 1a is turned on and switching element 1b is turned off when a voltage of DC capacitor 1e is output. When a zero voltage is output, in contrast, switching element 1a is turned off and switching element 1b is turned on. A pulse width modulation (PWM) scheme has thus been known as a scheme for controlling a converter which can output a binary voltage level.

Under the pulse width modulation scheme, a pulse width of a gate signal supplied to a switching element is controlled such that a DC component of a desired voltage or an AC component of a fundamental wave can be output in a time average manner. By making pulses from a plurality of converters different in timing, a voltage less in harmonic component can be supplied as a combined voltage. For example, a method of determining timing of switching at a point of intersection between signals based on comparison of a triangular wave or a saw tooth wave of a fixed frequency with a voltage command value has been known.

(Operation of Circulating Current Control Portion 5b)

Circulating current values Iccu, Iccv, and Iccw of the U phase, the V phase, and the W phase operated by current operation portion 5a are sent to circulating current control portion 5b. Circulating current control portion 5b subjects the circulating current value to feedback control such that the circulating current value matches with a circulating current command value. Therefore, circulating current control portion 5b is provided with compensator 5b18 which amplifies a difference between a circulating current command value and a circulating current value. Though a zero current is normally provided as a circulating current command value, a non-zero value may also be provided when imbalance occurs in a power system. Circulating current control portion 5b outputs a voltage component to be output by cell groups 6c and 6d for control of a circulating current as voltage command value Vccref (Vccrefu for the U phase, Vccrefv for the V phase, and Vccrefw for the W phase).

The circulating current flows through legs of different phases. Cell groups 6a and 6b and reactors 7a and 7b are present in a path for the circulating current and a circulating current is produced by application of a potential difference produced by switching of cell groups 6a and 6b to reactors 7a and 7b. Therefore, a circulating current is suppressed by application of a voltage opposite in polarity to the reactors by cell groups 6c and 6d provided in the same path.

For example, when circulating current Iccu flows from the positive-side DC terminal toward the negative-side DC terminal of leg circuit 8a and when a positive voltage is output from each of cell groups 6c and 6d of leg circuit 8a, a voltage in a direction of lowering in circulating current is applied to reactors 7a and 7b. When a current flows in a direction reverse to the above, a circulating current can be attenuated by applying a voltage from cell groups 6c and 6d also in the reverse direction. Therefore, as shown in FIG. 4, circulating current control portion 5b carries out feedback control by using compensator 5b18 which amplifies a difference between the circulating current command value and the circulating current value.

Since circulating currents Iccu, Iccv, and Iccw which flow through respective leg circuits 8 have positive and negative polarities, voltage command value Vccref output from compensator 5b18 also has positive and negative polarities. In contrast, when converter cell 1 configured as a half bridge shown in FIG. 2(a) is employed in cell groups 6c and 6d for control of a circulating current, converter cell 1 can output only a zero voltage or a positive voltage (a voltage value of the capacitor), and hence such an unfavorable condition should be avoided. In this case, if a DC bias signal is simply added to voltage command value Vccref, DC capacitor 1e of converter cell 1 will disadvantageously be kept charged because a DC current 1d flows between leg circuits 8a, 8b, and 8c and DC circuit 4 in the power conversion device configured in FIG. 1. The power conversion device in the first embodiment thus adopts circulating current control portion 5b configured as shown in FIG. 4. An operation of circulating current control unit 5b is described in further detail below.

In general, in a circuit scheme of the power conversion device shown in FIGS. 1 and 2, each converter cell 1 has been known to be controlled such that energy which flows in and out of DC capacitor 1e is substantially zero. In order to achieve this, a command value for AC control and a command value for DC control are provided to each converter cell 1 such that AC power which flows in and DC power which flows out match with each other or AC power which flows out and DC power which flows in match with each other, which means that, when each converter cell 1 constituting positive-side cell group 6a is controlled with voltage command value Vpref, active power which flows in or out of each converter cell 1 is substantially zero under a current condition at that time (magnitude and a phase of an AC current, a DC current, and a circulating current).

Therefore, even though a signal in proportion to voltage command value Vpref for positive-side cell group 6a is provided to positive-side cell group 6c for control of a circulating current, positive-side cell group 6a and positive-side cell group 6c are equal to each other in current condition and therefore active power which flows in or out of each converter cell 1 constituting positive-side cell group 6c can be substantially 0. Since voltage command value Vpref2 for control of a circulating current provided to positive-side cell group 6c serves for control of a voltage to be applied at reactors 7a and 7b, power which flows in or out of each cell 1 constituting positive-side cell group 6c based on voltage command value Vpref2 is mainly composed of reactive power. This is also applicable to negative-side cell group 6d for control of a circulating current. Essentially, cell groups 6c and 6d for control of a circulating current have to output substantially no active power.

From the point of view above, multiplier 5b20 in FIG. 4 multiplies positive-side voltage correction value Vpcorr representing a value in proportion to voltage command value Vpref for positive-side cell group 6a by an output value from adder 5b 19 (a result of addition of 1 to voltage command value Vccref output from compensator 5b18). The output value from multiplier 5b20 is used as voltage command value Vpref2 for positive-side cell group 6c. In this case, an output value from each converter cell 1 constituting positive-side cell group 6c is increased or decreased from a condition of active power of zero in accordance with the output value from compensator 5b 18 (voltage command value Vccref). When the output value from compensator 5b18 is positive, the output value from adder 5b19 is greater than 1.0, whereas when the output value from compensator 5b18 is negative, the output value from adder 5b19 is smaller than 1.0. Therefore, positive-side voltage correction value Vpcorr can be modified in accordance with the output value from compensator 5b 18. A circulating current can be controlled by setting modified positive-side voltage correction value Vpcorr as voltage command value Vpref2 to be output from positive-side cell group 6c. The above is also applicable to voltage control of each cell 1 in negative-side cell group 6d.

Figure 5:
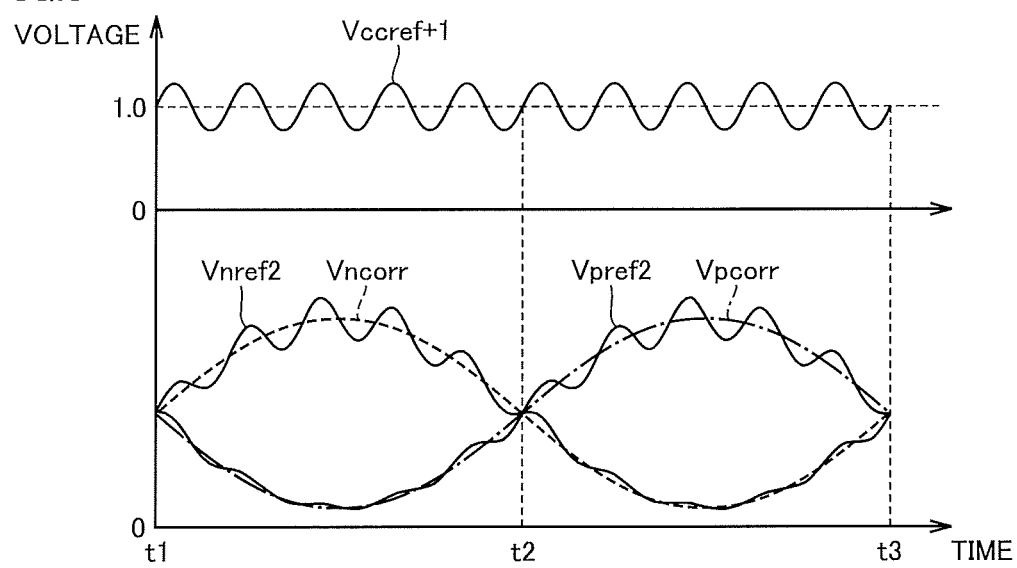
FIG. 5 is a waveform diagram schematically showing change over time of each signal in FIG. 4.

FIG. 5 is a waveform diagram schematically showing change over time of each signal in FIG. 4. The waveform diagram in FIG. 5 representatively shows a waveform of one phase of a three-phase alternating current.

Referring to FIG. 5, positive-side voltage correction value Vpcorr (a chain dotted line) and negative-side voltage correction value Vncorr (a dashed line) are in proportion to voltage command values Vpref and Vnref for cell groups 6a and 6b generated by command value combination portions 5e and 5f in FIG. 3, respectively. Command value combination portion 5f combines AC voltage command value Vacref output from AC control portion 5c as it is with DC voltage command value Vdcref output from DC control portion 5d, whereas command value combination portion 5e combines AC voltage command value Vacref with DC voltage command value Vdcref with a polarity thereof being inverted. Therefore, AC components of voltage command values Vpref and Vnref for cell groups 6a and 6b are opposite in polarity to each other, and AC components of voltage correction values Vpcorr and Vncorr for control of a circulating current are also opposite in polarity to each other.

Voltage command values Vpref2 and Vnref2 for cell groups 6c and 6d are obtained by multiplying an output value from adder 5b19 (that is, Vccref+1) by voltage correction values Vpcorr and Vncorr, respectively. Therefore, sensitivity of the output value from compensator 5b18 (that is, voltage command value Vccref for control of a circulating current) to voltage command values Vpref2 and Vnref2 is dependent on magnitude of voltage correction values Vpcorr and Vncorr. Consequently, as shown in FIG. 5, sensitivity of voltage command value Vccref to voltage command value Vpref2 for positive-side cell group 6c and sensitivity of voltage command value Vccref to voltage command value Vnref2 for negative-side cell group 6d repeat increase and decrease for each half cycle of an AC period. Specifically, in a first half cycle of the alternating current in FIG. 5 (from time t1 to time t2), a circulating current is controlled mainly in negative-side cell group 6d so as to match with a command value thereof, and a voltage of DC capacitor 1e is controlled to be constant in value in positive-side cell group 6c. In a remaining half cycle in FIG. 5 (from time t2 to time t3), a circulating current is controlled mainly in positive-side cell group 6c so as to match with a command value thereof and a voltage of DC capacitor 1e is controlled to be constant in value in negative-side cell group 6d. As an operation to control a circulating current is thus alternately performed in positive-side cell group 6c and negative-side cell group 6d for each half cycle of the alternating current, control of the circulating current and maintaining of a voltage of the DC capacitor can both be achieved.

Proportional gain K is set to any such value as not saturating an output voltage from converter cell 1 when voltage command value Vccref for control of a circulating current is provided. When converter cell 1 configured as a full bridge shown in FIG. 2(b) constitutes each cell 1 of cell groups 6c and 6d for control of a circulating current, each cell 1 can output a voltage of both polarities and hence proportional gain K can also be set to 0.

(Operation of Gate Control Portions 5n and 5o)

Gate control portion 5n provides corresponding gate signals Gp2u, Gp2v, and Gp2w to the switching element of cell 1 constituting positive-side cell group 6c of the corresponding phase based on voltage command values Vpref2u, Vpref2v, and Vpref2w of the U phase, the V phase, and the W phase output from multiplier 5b20. Gate control portion 5o provides corresponding gate signals Gn2u, Gn2v, and Gn2w to the switching element of cell 1 constituting negative-side cell group 6d of each phase based on voltage command values Vnref2u, Vnref2v, and Vnref2w of the U phase, the V phase, and the W phase output from multiplier 5b21. Gate control portions 5n and 5o can be operated under a pulse width modulation scheme similarly to gate control portions 5k and 5m.

Effect of First Embodiment

As set forth above, the power conversion device according to the first embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device. With cell groups 6a and 6b, an electric quantity of each of AC terminals Nu, Nv, and Nw and DC terminals Np and Nn can reliably be controlled without interference by control of a circulating current.

Furthermore, the power conversion device according to the first embodiment can control a value of a circulating current in accordance with a circulating current command value by including cell groups 6c and 6d for control of a circulating current. Voltage command value Vpref2 for positive-side cell group 6c is generated by multiplying a value in proportion to voltage command value Vpref for positive-side cell group 6a by voltage command value Vccref for control of a circulating current. Similarly, voltage command value Vnref2 for negative-side cell group 6d is generated by multiplying a value in proportion to voltage command value Vnref for negative-side cell group 6b by voltage command value Vccref for control of a circulating current. One of cell groups 6c and 6d thus mainly controls a circulating current, the other mainly controls a voltage of DC capacitor 1e to be constant, and switching between roles in control is made for each half cycle of the alternating current. Consequently, control of the circulating current and maintaining of a voltage of the DC capacitor can reliably both be achieved.

[Modification]

In the embodiment above, an example in which each cell 1 constituting cell groups 6a and 6b which are not for control of a circulating current and each cell 1 constituting cell groups 6c and 6d for control of a circulating current are identical in configuration is shown. Unlike this configuration, each cell constituting cell groups 6a and 6b and each cell constituting cell groups 6c and 6d may be different in configuration from each other. An effect the same as above is achieved also in this case.

In each leg circuit 8 in FIG. 1, cell groups 6c and 6d alone can also be provided without providing cell groups 6a and 6b. In this case, gate control portions 5k and 5m in FIG. 3 are not required either. According to such a configuration as well, circulating current control portion 5b generates voltage command values Vpref2 and Vnref2 for output voltages from cell groups 6c and 6d through a non-linear operation (specifically, multiplication) of voltage command values Vpref and Vnref for control of electric quantities of AC terminals Nu, Nv, and Nw and electric quantities of DC terminals Np and Nn and voltage command value Vccref for control of a circulating current. When voltage command values Vpref2 and Vnref2 for cell groups 6c and 6d are generated through linear combination between voltage command values Vpref and Vnref and voltage command value Vccref, control of a circulating current and control of electric quantities of the AC terminal and the DC terminal may interfere with each other. In contrast, by generating voltage command values Vpref2 and Vnref2 for cell groups 6c and 6d only through a non-linear operation of voltage command values Vpref and Vnref and voltage command value Vccref (that is, without using linear combination), control of a circulating current and control of electric quantities of the AC terminal and the DC terminal can both be achieved.

When cell groups 6a and 6b are not provided (or attention is paid only to cell groups 6c and 6d), control device 5 performs a non-linear operation of a voltage command value for suppression of a circulating current which circulates through leg circuit 8 and at least one voltage command value for control of other currents (a DC current and an AC current) which flow through leg circuit 8. It can then be assumed that a plurality of chopper cells 20 constituting each leg circuit 8 operate in accordance with a result of the non-linear operation.

Second Embodiment

Figure 6:
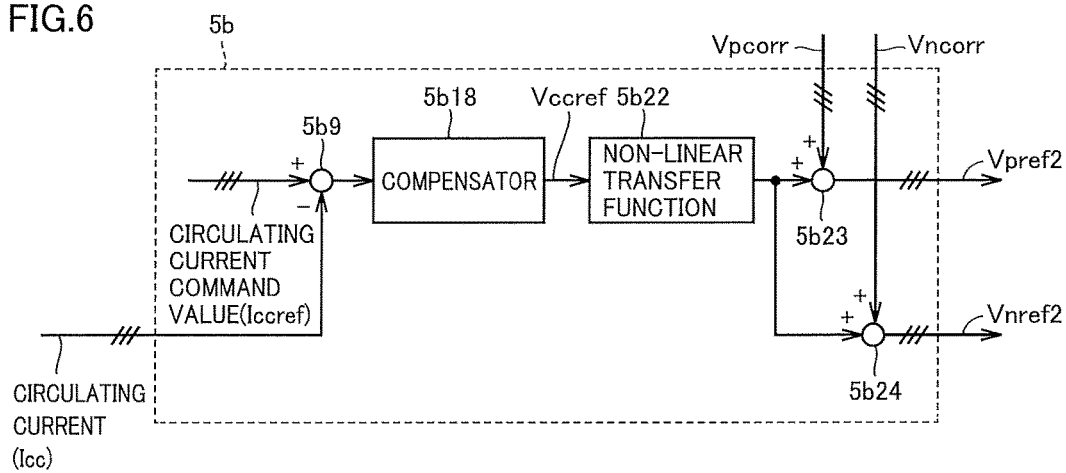
FIG. 6 is a diagram showing a configuration of circulating current control portion 5b in the power conversion device according to a second embodiment.

FIG. 6 is a diagram showing a configuration of circulating current control portion 5b in the power conversion device according to a second embodiment. Since the overall configuration of the power conversion device is the same as described with reference to FIG. 1 and the configuration of each cell 1 is the same as described with reference to FIG. 2, description will not be repeated. Since the configuration of control device 5 is the same as described with reference to FIG. 3 except for the configuration of circulating current control portion 5b, description will not be repeated.

[Overview of Configuration and Operation of Circulating Current Control Portion 5b]

Referring to FIG. 6, circulating current control portion 5b in the second embodiment includes subtractor 5b9, compensator 5b18, a non-linear transfer function application portion 5b22, and adders 5b23 and 5b24.

Subtractor 5b9 calculates a difference between circulating current command value Iccref (Iccrefu for the U phase, Iccrefv for the V phase, and Iccrefw for the W phase) and circulating current value Icc (Iccu of the U phase, Iccv of the V phase, and Iccw of the W phase) by subtracting the circulating current value from the circulating current command value. Compensator 5b18 generates voltage command value Vccref for control of a circulating current (Vccrefu for the U phase, Vccrefv for the V phase, and Vccrefw for the W phase) by amplifying the calculated difference.

An output value (voltage command value Vccref) from compensator 5b18 is subjected to a non-linear operation by non-linear transfer function application portion 5b22. Adder 5b23 generates voltage command value Vpref2 for positive-side cell group 6c by adding a result of operation by non-linear transfer function application portion 5b22 to positive-side voltage correction value Vpcorr. Adder 5b24 generates voltage command value Vnref2 for negative-side cell group 6d by adding a result of operation by non-linear transfer function application portion 5b22 to negative-side voltage correction value Vncorr. As described in the first embodiment, voltage correction values Vpcorr and Vncorr are in proportion to voltage command values Vpref and Vnref for cell groups 6a and 6b, respectively.

Circulating current control portion 5b thus generates voltage command values Vpref2 and Vnref2 for controlling cell groups 6c and 6d for control of a circulating current only through a non-linear operation of voltage command value Vccref based on circulating current Icc and voltage command values Vpref and Vnref which are based on AC current Iac and DC current Idc but are not based on circulating current Icc (that is, not through linear combination).

[Details of Operation of Circulating Current Control Portion 5b]

A detailed operation of circulating current control portion 5b will now be described. Circulating current values Iccu, Iccv, and Iccw of the U phase, the V phase, and the W phase operated by current operation portion 5a are sent to circulating current control portion 5b. Circulating current control portion 5b subjects the circulating current value to feedback control such that the circulating current value matches with the circulating current command value. Therefore, circulating current control portion 5b is provided with compensator 5b18 which amplifies a difference between a circulating current command value and a circulating current value. Non-linear transfer function application portion 5b22 is applied to an output value from compensator 5b18 (voltage command value Vccref) (subjects the output value to a non-linear operation).

Non-linear transfer function application portion 5b22 operates to increase sensitivity (increase a ratio of an output to an input) when magnitude of the input (absolute value) is not smaller than a threshold value and to lower sensitivity (lower a ratio of an output to an input) when an absolute value of the input is smaller than the threshold value. For example, non-linear transfer function application portion 5b22 can be implemented by a table for determining input and output characteristics or determination of a condition.

Figure 7:
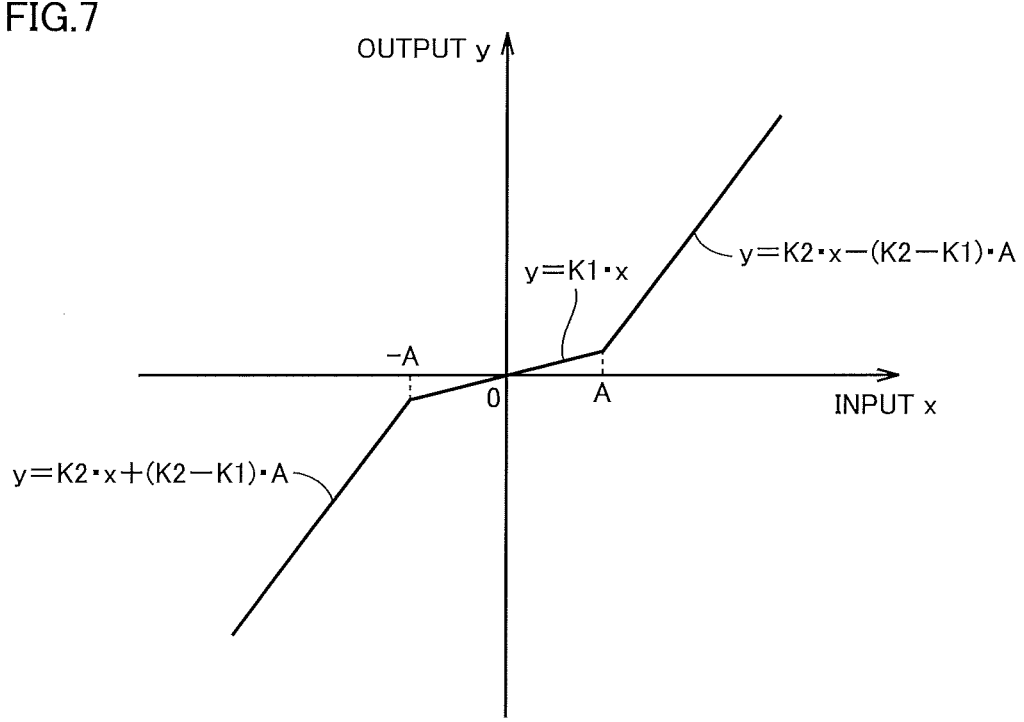
FIG. 7 is a diagram showing one example of relation between an input and an output of a non-linear transfer function application portion 5b22 in FIG. 6.

FIG. 7 is a diagram showing one example of relation between an input to and an output from non-linear transfer function application portion 5b22 in FIG. 6. Referring to FIG. 7, an input to non-linear transfer function application portion 5b22 is denoted by x and an output therefrom is denoted by y. An absolute value of input x is denoted by ABS(x), a sign of input x is denoted by SIGN(x), and K1, K2, and A are defined as constants. Then, output y is given in expressions below.

When $ABS(x) < A, y = K1 \cdot x$ (12A)

When $ABS(x) \geq A, y = K2 \cdot x - SIGN(x) \cdot (K2 - K1) \cdot A$ (12B)

In the expressions above, by setting constants K1 and K2 so as to satisfy a condition of K1<K2, a gain by which an output from compensator 5b18 (input x) is multiplied increases from K1 to K2 when the output from compensator 5b18 is not smaller than constant A. Consequently, non-linear transfer function application portion 5b22 outputs a greater voltage command value (output y) for control of a circulating current.

As non-linear transfer function application portion 5b22 thus operates, greater voltage command value Vccref is output as a difference between circulating current Icc and a command value thereof is greater. Therefore, higher importance is placed on control of a circulating current (voltage command value Vccref) than on a function to maintain a voltage of the DC capacitor (voltage correction values Vpcorr and Vncorr). In contrast, smaller voltage command value Vccref is output as a difference between circulating current Icc and a command value thereof is smaller. Therefore, higher importance is placed on the function to maintain a voltage of the DC capacitor (voltage correction values Vpcorr and Vncorr) than on control of a circulating current (voltage command value Vccref). Consequently, control of a circulating current and maintaining of a voltage of the DC capacitor can both be achieved.

Effect of Second Embodiment

The power conversion device according to the second embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device as in the first embodiment. With cell groups 6a and 6b, an electric quantity of each of AC terminals Nu, Nv, and Nw and DC terminals Np and Nn can reliably be controlled without interference by control of a circulating current.

The power conversion device according to the second embodiment can control a circulating current value in accordance with a circulating current command value by including cell groups 6c an 6d for control of a circulating current. Voltage command value Vpref2 for positive-side cell group 6c is generated by adding a value in proportion to voltage command value Vpref for positive-side cell group 6a after a non-linear operation of voltage command value Vccref for control of a circulating current by non-linear transfer function application portion 5b22. Similarly, voltage command value Vnref2 for negative-side cell group 6d is generated by adding a value in proportion to voltage command value Vnref for negative-side cell group 6b after a non-linear operation of voltage command value Vccref for control of a circulating current by non-linear transfer function application portion 5b22. As a difference between circulating current Icc and a command value thereof is thus greater, a function to control a circulating current is exhibited more than a function to maintain a voltage of the DC capacitor. Therefore, control of a circulating current and maintaining of a voltage of the DC capacitor can reliably both be achieved.

[Modification]

In the embodiment above, an example in which each cell 1 constituting cell groups 6a and 6b which are not for control of a circulating current and each cell 1 constituting cell groups 6c and 6d for control of a circulating current are identical in configuration is shown. Unlike this configuration, each cell constituting cell groups 6a and 6b and each cell constituting cell groups 6c and 6d may be different in configuration from each other. An effect the same as above is achieved also in this case.

In each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portion 5n, adder 5b23, and gain circuit 5g associated therewith are not required either, which is advantageous in simplification of the configuration of control device 5. Similarly, when only reactor 7a on the positive side is provided, negative-side cell group 6d for control of a circulating current is not required and gate control portion 5o, adder 5b24, and gain circuit 5h associated therewith are not required either, which is advantageous in simplification of the configuration of control device 5.

Though an example in which a non-linear transfer function (5b22) has three constants is shown above, a high-order transfer function having more constants may be applicable.

In each leg circuit 8 in FIG. 1, cell groups 6c and 6d alone can also be provided without providing cell groups 6a and 6b. In this case, gate control portions 5k and 5m in FIG. 3 are not required either. According to such a configuration, circulating current control portion 5b generates voltage command values Vpref2 and Vnref2 for controlling output voltages from cell groups 6c and 6d through a non-linear operation (specifically by non-linear transfer function application portion 5b22) of voltage command values Vpref and Vnref for control of electric quantities of AC terminals Nu, Nv, and Nw and electric quantities of DC terminals Np and Nn and voltage command value Vccref for control of a circulating current. When voltage command values Vpref2 and Vnref2 for cell groups 6c and 6d are generated through linear combination between voltage command values Vpref and Vnref and voltage command value Vccref, control of a circulating current and control of electric quantities of the AC terminal and the DC terminal may interfere with each other. In contrast, by generating voltage command values Vpref2 and Vnref2 for cell groups 6c and 6d only through a non-linear operation of voltage command values Vpref and Vnref and voltage command value Vccref (that is, without using linear combination), control of a circulating current and control of electric quantities of the AC terminal and the DC terminal can both be achieved.

Third Embodiment

Figure 8:
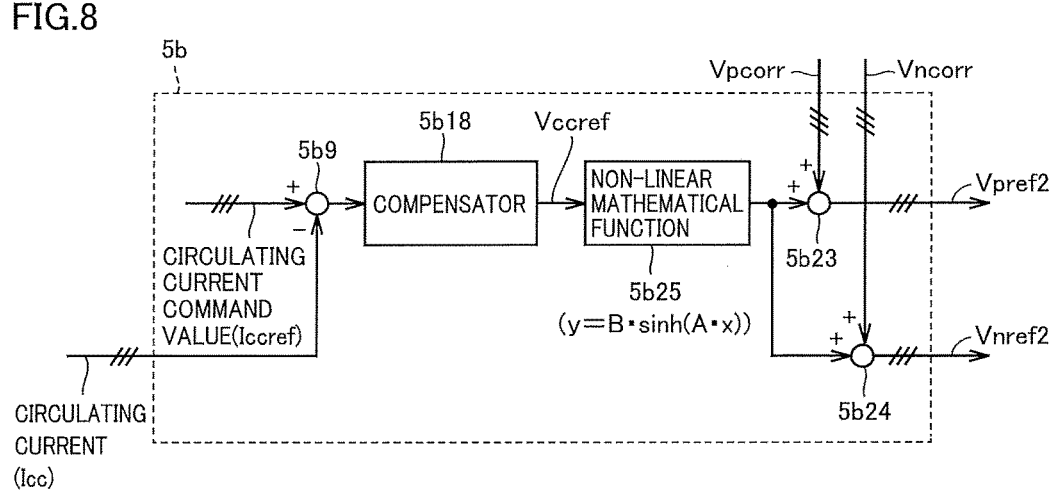
FIG. 8 is a diagram showing a configuration of circulating current control portion 5b in the power conversion device according to a third embodiment.

FIG. 8 is a diagram showing a configuration of circulating current control portion 5b in the power conversion device according to a third embodiment. Since the overall configuration of the power conversion device is the same as described with reference to FIG. 1 and the configuration of each cell 1 is the same as described with reference to FIG. 2, description will not be repeated. Since the configuration of control device 5 is the same as described with reference to FIG. 3 except for the configuration of circulating current control portion 5b, description will not be repeated.

[Configuration and Operation of Circulating Current Control Portion 5b]

Circulating current control portion 5b in FIG. 8 is different from circulating current control portion 5b in FIG. 6 in that a non-linear mathematical function application portion 5b25 is employed instead of non-linear transfer function application portion 5b22. Since FIG. 8 is otherwise the same as FIG. 6, the same or corresponding elements have the same reference characters allotted and description will not be repeated.

In this embodiment, non-linear mathematical function application portion 5b25 applies a smooth non-linear mathematical function to an output from compensator 5b18 (voltage command value Vccref for control of a circulating current). An input to non-linear mathematical function application portion 5b25 is denoted by x, an output therefrom is denoted by y, a hyperbolic sine function of input x is denoted as sin h(x), and A and B are defined as constants. Output y is then given in an expression below.

$$y = B \cdot \sin h(A \cdot x) \qquad (13)$$

The function expressed in the expression (13) is smaller in differential coefficient with decrease in magnitude of the output from compensator 5b18 (input x) (a ratio of an output to an input is lower), and the differential coefficient is greater (a ratio of an output to an input is greater) with increase in magnitude of an output from compensator 5b18. Constants A and B are used for adjustment of input and output characteristics of non-linear mathematical function application portion 5b25.

As non-linear mathematical function application portion 5b25 thus operates, greater voltage command value Vccref is output as a difference between circulating current Icc and a command value thereof is greater. Therefore, higher importance is placed on control of a circulating current (voltage command value Vccref) than the function to maintain a voltage of the DC capacitor (voltage correction values Vpcorr and Vncorr). In contrast, smaller voltage command value Vccref is output as a difference between circulating current Icc and a command value thereof is smaller. Therefore, higher importance is placed on the function to maintain a voltage of the DC capacitor (voltage correction values Vpcorr and Vncorr) than on control of a circulating current (voltage command value Vccref). Consequently, control of a circulating current and maintaining of a voltage of the DC capacitor can both be achieved.

By using a non-linear mathematical function (5b25) of which output y is smoothly varied in response to variation in input x, a discontinuous operation of circulating current control portion 5b can be suppressed and hence feedback control of a circulating current is effectively stabilized.

Effect of Third Embodiment

The power conversion device according to the third embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device, as in the first embodiment. With cell groups 6a and 6b, an electric quantity of each of AC terminals Nu, Nv, and Nw and DC terminals Np and Nn can reliably be controlled without interference by control of a circulating current.

The power conversion device according to the third embodiment can control a circulating current value in accordance with a circulating current command value by including cell groups 6c and 6d for control of a circulating current. Voltage command value Vpref2 for positive-side cell group 6c is generated by addition of a value in proportion to voltage command value Vpref for positive-side cell group 6a after a non-linear operation of voltage command value Vccref for control of a circulating current by non-linear mathematical function application portion 5b25. Similarly, voltage command value Vnref2 for negative-side cell group 6d is generated by addition of a value in proportion to voltage command value Vnref for negative-side cell group 6b after a non-linear operation of voltage command value Vccref for control of a circulating current by non-linear mathematical function application portion 5b25. As a difference between circulating current Icc and a command value thereof is thus greater, the function to control a circulating current is exhibited more than the function to maintain a voltage of the DC capacitor and therefore control of the circulating current and maintaining of a voltage of the DC capacitor can reliably both be achieved.

[Modification]

In the embodiment above, an example in which each cell 1 constituting cell groups 6a and 6b which are not for control of a circulating current and each cell 1 constituting cell groups 6c and 6d for control of a circulating current are identical in configuration is shown. Unlike this configuration, each cell constituting cell groups 6a and 6b and each cell constituting cell groups 6c and 6d may be different in configuration from each other. An effect the same as above is achieved also in this case.

In each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portion 5n, adder 5b23, and gain circuit 5g associated therewith are not required either, which is advantageous in simplification of the configuration of control device 5. Similarly, when only reactor 7a on the positive side is provided, negative-side cell group 6d for control of a circulating current is not required and gate control portion 5o, adder 5b24, and gain circuit 5h associated therewith are not required either, which is advantageous in simplification of the configuration of control device 5.

A non-linear mathematical function (5b25) is not limited to the example above, and the effect the same as above is achieved so long as a non-linear mathematical function has such characteristics that a differential coefficient is greater with increase in input x.

In each leg circuit 8 in FIG. 1, cell groups 6c and 6d alone can also be provided without providing cell groups 6a and 6b. In this case, gate control portions 5k and 5m in FIG. 3 are not required either. According to such a configuration, circulating current control portion 5b generates voltage command values Vpref2 and Vnref2 for controlling output voltages from cell groups 6c and 6d through a non-linear operation (specifically by non-linear mathematical function application portion 5b25) of voltage command values Vpref and Vnref for controlling electric quantities of AC terminals Nu, Nv, and Nw and electric quantities of DC terminals Np and Nn and voltage command value Vccref for control of a circulating current. When voltage command values Vpref2 and Vnref2 for cell groups 6c and 6d are generated through linear combination between voltage command values Vpref and Vnref and voltage command value Vccref, control of a circulating current and control of the electric quantities of the AC terminal and the DC terminal may interfere with each other. In contrast, by generating voltage command values Vpref2 and Vnref2 for cell groups 6c and 6d only through a non-linear operation of voltage command values Vpref and Vnref and voltage command value Vccref (that is, without using linear combination), control of a circulating current and control of the electric quantities of the AC terminal and the DC terminal can both be achieved.

Fourth Embodiment

Figure 9:
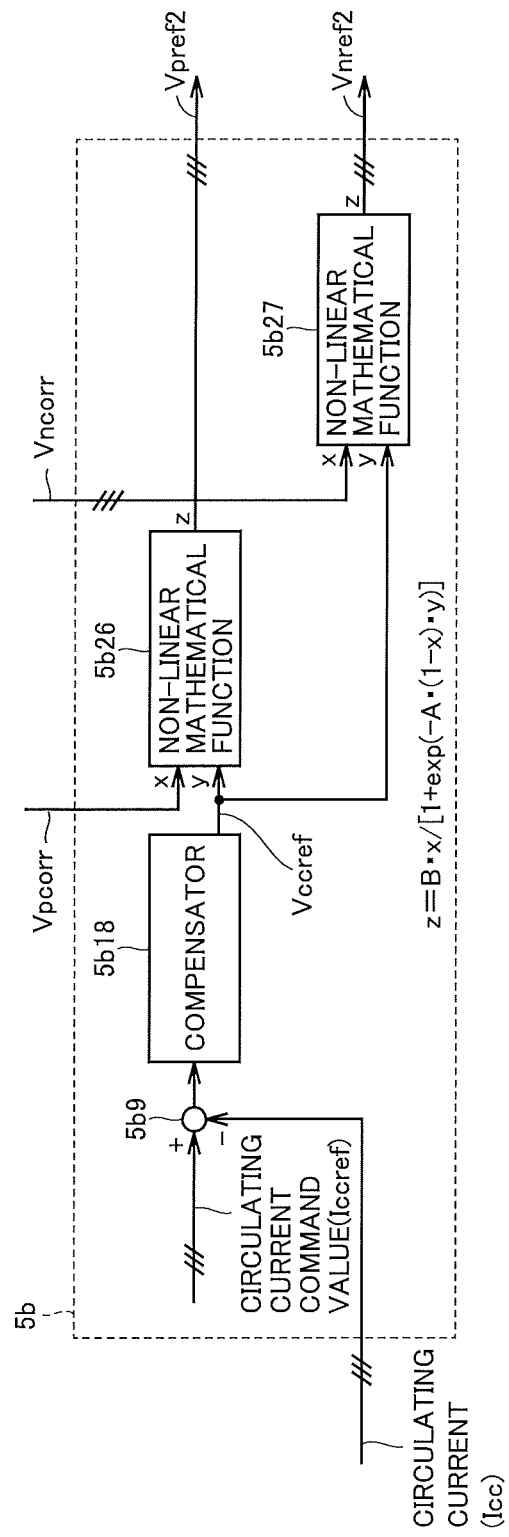
FIG. 9 is a diagram showing a configuration of circulating current control portion 5b in the power conversion device according to a fourth embodiment.

FIG. 9 is a diagram showing a configuration of circulating current control portion 5*b* in the power conversion device according to a fourth embodiment. Since the overall configuration of the power conversion device is the same as described with reference to FIG. 1 and the configuration of each cell 1 is the same as described with reference to FIG. 2, description will not be repeated. Since the configuration of control device 5 is the same as described with reference to FIG. 3 except for the configuration of circulating current control portion 5*b*, description will not be repeated.

[Configuration and Operation of Circulating Current Control Portion 5*b*]

Referring to FIG. 9, circulating current control portion 5*b* includes subtractor 5*b*9, compensator 5*b*18, a non-linear mathematical function application portion 5*b*26, and a non-linear mathematical function application portion 5*b*27. Since subtractor 5*b*9 and compensator 5*b*18 are the same as described with reference to FIGS. 6 and 8, description will not be repeated.

Non-linear mathematical function application portion 5*b*26 receives positive-side voltage correction value Vpcorr and an output value (voltage command value Vccref) from compensator 5*b*18 as inputs x and y and outputs a value z obtained by applying a smooth non-linear function to inputs x and y as voltage command value Vpref2 for positive-side cell group 6*c*. Similarly, non-linear mathematical function application portion 5*b*27 receives negative-side voltage correction value Vncorr and an output value from compensator 5*b*18 (voltage command value Vccref) as inputs x and y and outputs a value z obtained by applying a smooth non-linear function to inputs x and y as voltage command value Vnref2 for negative-side cell group 6*d*.

As described already, positive-side voltage correction value Vpcorr is a command value for maintaining a constant capacitor voltage of each cell in positive-side cell group 6*c*. Negative-side voltage correction value Vncorr is a command value for maintaining a constant capacitor voltage of each cell in negative-side cell group 6*d*. Voltage command value Vccref output from compensator 5*b* 18 is a command value for control of a circulating current.

Non-linear mathematical function application portions 5*b*26 and 5*b*27 apply the same non-linear function to input x (positive-side voltage correction value Vpcorr or negative-side voltage correction value Vncorr) and input y (voltage command value Vccref) in the present embodiment. Specifically, output z from each of non-linear mathematical function application portions 5*b*26 and 5*b*27 is given in an expression (14) below with A and B being defined as constants.

$$z = B \cdot x / [1 + \exp(-A \cdot (1-x) \cdot y)] \quad (14)$$

The function expressed in the expression (14) is smaller in its function value (output z) with decrease in magnitude of an output (input y) from compensator 5*b* 18 and is greater in its function value (output z) with increase in magnitude of an output (input y) from compensator 5*b*18. The function value (output z) is greater with increase in voltage correction value Vpcorr or Vncorr (input x) and the function value (output z) is smaller with decrease in voltage correction value (input x). Constants A and B (both of which are positive) are used for adjustment of input and output characteristics of non-linear mathematical function application portions 5*b*26 and 5*b*27.

Figure 10:
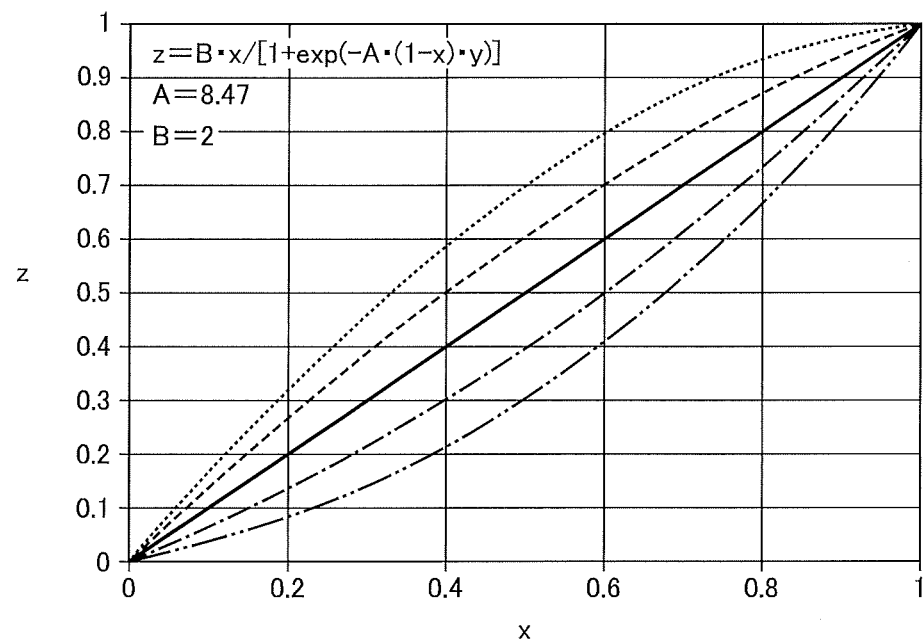
FIG. 10 is a diagram showing one example of relation between inputs x and y and an output z of a non-linear mathematical function application portion in FIG. 9.

FIG. 10 shows one example of the function expressed in the expression (14). The graph in FIG. 10 shows values of output z for a range of x from 0 to 1 and a range of y from −0.2 to 0.2 when constant A is set to 8.47 and constant B is set to 2. The function expressed in the expression (14) has such characteristics that, with input x being around 0, output z is greater than 0 even when y is varied, and with input x being around 1, output z is smaller than 1 even when y is varied.

With such an operation by non-linear mathematical function application portions 5*b*26 and 5*b*27, voltage command value Vccref is generated in accordance with a difference between circulating current Icc and a command value thereof, and voltage command values Vpref2 and Vnref2 are output in accordance with voltage command value Vccref and voltage correction values Vpcorr and Vncorr. Therefore, the function to control a circulating current (voltage command value Vccref) and the function to maintain a voltage of the DC capacitor (voltage correction values Vpcorr and Vncorr) simultaneously operate and voltage command values Vpref2 and Vnref2 can smoothly be restricted within a range of a duty in which the chopper cells can operate. Consequently, control of a circulating current and maintaining of a voltage of the DC capacitor can both be achieved without saturation of outputs from the chopper cells.

Since a discontinuous operation of circulating current control portion 5*b* can be suppressed by using a non-linear mathematical function (5*b*26 and 5*b*27) of which output z is smoothly varied in response to variation in inputs x and y, feedback control of a circulating current is effectively stabilized.

Effect of Fourth Embodiment

The power conversion device according to the fourth embodiment includes cell groups 6*a* and 6*b* which exclusively (that is, without being used for control of a circulating current) control an electric quantity (a current and a voltage) of each of AC terminals Nu, Nv, and Nw and DC terminals Np and Nn, which is a main purpose of the power conversion device, as in the first embodiment. With cell groups 6*a* and 6*b*, an electric quantity of each of AC terminals Nu, Nv, and Nw and DC terminals Np and Nn can reliably be controlled without interference by control of a circulating current.

The power conversion device according to the fourth embodiment can control a circulating current value in accordance with a circulating current command value by including cell groups 6*c* and 6*d* for control of a circulating current. Voltage command value Vpref2 for positive-side cell group 6*c* is generated by subjecting voltage command value Vccref for control of a circulating current and voltage correction value Vpcorr to a non-linear operation by non-linear mathematical function application portion 5*b*26. Similarly, voltage command value Vnref2 for negative-side cell group 6*d* is generated by subjecting voltage command value Vccref for control of a circulating current and voltage correction value Vncorr to a non-linear operation by non-linear mathematical function application portion 5*b*27. Since voltage command values Vpref2 and Vnref2 thus operate without exceeding a range of duties of the chopper cells, control of a circulating current and maintaining of a voltage of the DC capacitor can reliably both be achieved.

[Modification]

In the embodiment above, an example in which each cell 1 constituting cell groups 6a and 6b which are not for control of a circulating current and each cell 1 constituting cell groups 6c and 6d for control of a circulating current are identical in configuration is shown. Unlike this configuration, each cell constituting cell groups 6a and 6b and each cell constituting cell groups 6c and 6d may be different in configuration from each other. An effect the same as above is achieved also in this case.

In each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portion 5n, non-linear mathematical function application portion 5b26, and gain circuit 5g associated therewith are not required either, which is advantageous in simplification of the configuration of control device 5. Similarly, when only reactor 7a on the positive side is provided, negative-side cell group 6d for control of a circulating current is not required and gate control portion 5o, non-linear mathematical function application portion 5b27, and gain circuit 5h associated therewith are not required either, which is advantageous in simplification of the configuration of control device 5.

A non-linear mathematical function (5b26 and 5b27) is not limited to the example above, and the effect the same as above is achieved so long as a non-linear mathematical function has such characteristics that a function value (output z) thereof is greater with increase in inputs x and y and a function value thereof (output z) is within a determined range (in the example above, within a range from 0 to 1).

In each leg circuit 8 in FIG. 1, cell groups 6c and 6d alone can also be provided without providing cell groups 6a and 6b. In this case, gate control portions 5k and 5m in FIG. 3 are not required either. According to such a configuration, circulating current control portion 5b generates voltage command values Vpref2 and Vnref2 for controlling output voltages from cell groups 6c and 6d through a non-linear operation (specifically by non-linear mathematical function application portions 5b26 and 5b27) of voltage command values Vpref and Vnref for controlling electric quantities of AC terminals Nu, Nv, and Nw and electric quantities of DC terminals Np and Nn and voltage command value Vccref for control of a circulating current. When voltage command values Vpref2 and Vnref2 for cell groups 6c and 6d are generated by linear combination between voltage command values Vpref and Vnref and voltage command value Vccref, control of a circulating current and control of the electric quantities of the AC terminal and the DC terminal may interfere with each other. In contrast, by generating voltage command values Vpref2 and Vnref2 for cell groups 6c and 6d only through a non-linear operation of voltage command values Vpref and Vnref and voltage command value Vccref (that is, without using linear combination), control of a circulating current and control of the electric quantities of AC terminals Nu, Nv, and Nw and DC terminals Np and Nn can both be achieved.

Fifth Embodiment

Figure 11:
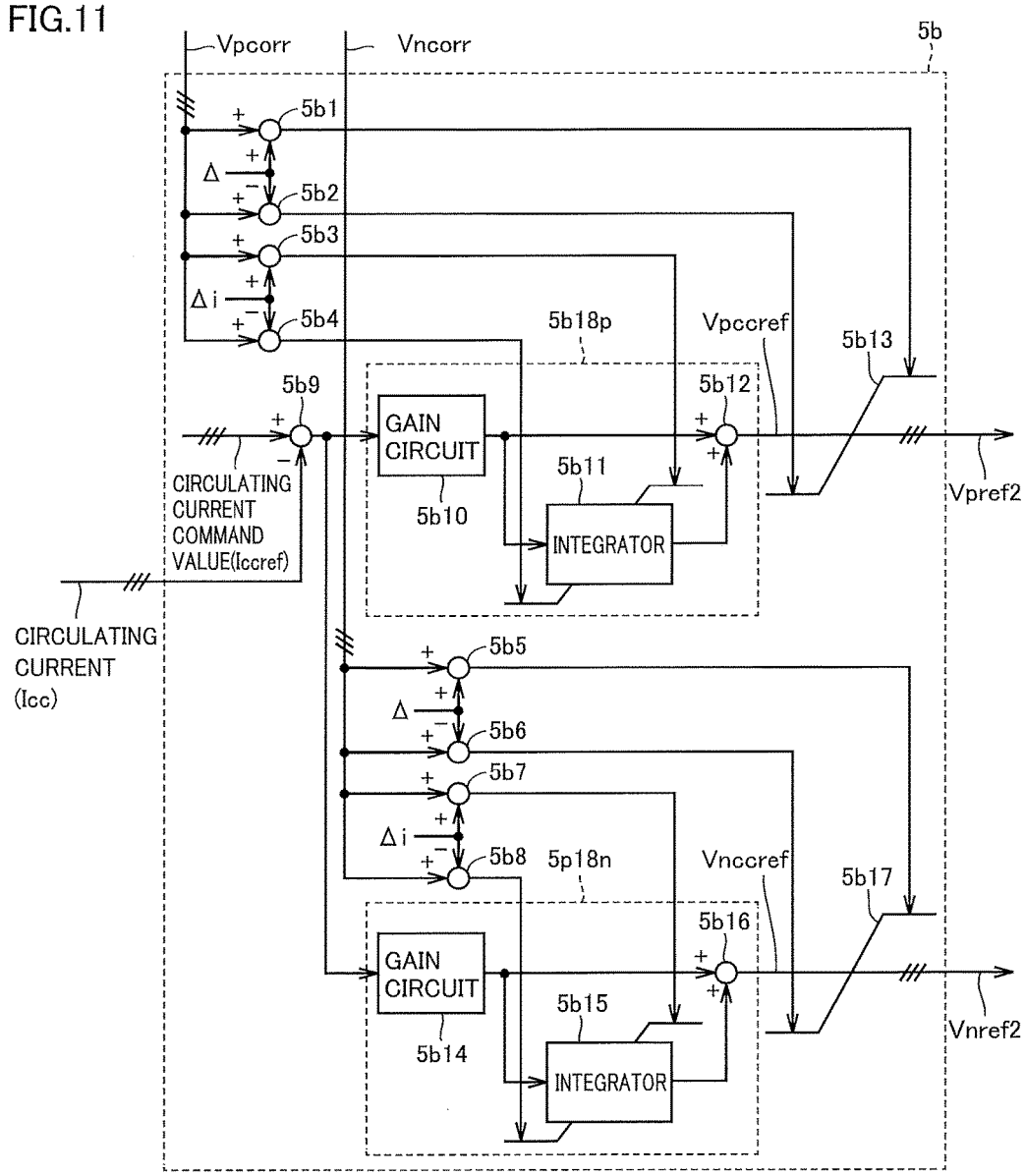
FIG. 11 is a diagram showing a configuration of circulating current control portion 5b in the power conversion device according to a fifth embodiment.

FIG. 11 is a diagram showing a configuration of circulating current control portion 5b in the power conversion device according to a fifth embodiment. Since the overall configuration of the power conversion device is the same as described with reference to FIG. 1 and the configuration of each cell 1 is the same as described with reference to FIG. 2, description will not be repeated. Since the configuration of control device 5 is the same as described with reference to FIG. 3 except for the configuration of circulating current control portion 5b, description will not be repeated.

[Overview of Configuration and Operation of Circulating Current Control Portion 5b]

Referring to FIG. 11, in the fifth embodiment, circulating current control portion 5b includes adders 5b1, 5b3, 5b5, and 5b7, subtractors 5b2, 5b4, 5b6, 5b8, and 5b9, compensators 5b18p and 5b18n, and limiters 5b13 and 5b17. Compensator 5b18p is a proportional integral compensator and includes a gain circuit 5b10, an integrator 5b11 with a limiter, and an adder 5b12. Similarly, compensator 5b18n is a proportional integral compensator and includes a gain circuit 5b14, an integrator 5b15 with a limiter, and an adder 5b16.

Subtractor 5b9 calculates a difference between circulating current command value Iccref (Iccrefu for the U phase, Iccrefv for the V phase, and Iccrefw for the W phase) and circulating current value Icc (Iccu of the U phase, Iccv of the V phase, and Iccw of the W phase) by subtracting the circulating current value from the circulating current command value for each phase.

Compensator 5b18p generates a voltage command value Vpccref for control of a circulating current (Vpccrefu for the U phase, Vpccrefv for the V phase, and Vpccrefw for the W phase) by amplifying the difference calculated by subtractor 5b9. In compensator 5b18p, gain circuit 5b10 amplifies the difference output from subtractor 5b9. Integrator 5b11 integrates the output from gain circuit 5b 10. Adder 5b12 adds the output from gain circuit 5b10 and the output from integrator 5b11 to each other. The output from adder 5b12 is used as voltage command value Vpref2 for positive-side cell group 6c after it passes through limiter 5b13.

Similarly, compensator 5b18n generates a voltage command value Vnccref for control of a circulating current (Vnccrefu for the U phase, Vnccrefv for the V phase, and Vnccrefw for the W phase) by amplifying the difference calculated by subtractor 5b9. In compensator 5b18n, gain circuit 5b14 amplifies the difference output from subtractor 5b9. Integrator 5b15 integrates the output from gain circuit 5b14. Adder 5b16 adds the output from gain circuit 5b14 and the output from integrator 5b15 to each other. The output from adder 5b16 is used as voltage command value Vnref2 for negative-side cell group 6d after it passes through limiter 5b17.

Voltage correction values Vpcorr and Vncorr in addition to circulating current Icc are input to circulating current control portion 5b. As described in the first embodiment, voltage correction values Vpcorr and Vncorr are in proportion to voltage command values Vpref and Vnref for cell groups 6a and 6b, respectively.

Adder 5b1 generates an upper limit value of limiter 5b13 by adding a fixed value Δ to voltage correction value Vpcorr. Subtractor 5b2 generates a lower limit value of limiter 5b13 by subtracting fixed value Δ from voltage correction value Vpcorr. Adder 5b3 generates an output upper limit value of integrator 5b11 by adding a fixed value Δi to voltage correction value Vpcorr. Subtractor 5b4 generates an output lower limit value of integrator 5b11 by subtracting fixed value Δi from voltage correction value Vpcorr. In order to prevent wind-up phenomena, fixed value Δi should be smaller than fixed value Δ.

Similarly, adder 5b5 generates an upper limit value of limiter 5b17 by adding fixed value Δ to voltage correction value Vncorr. Subtractor 5b6 generates a lower limit value of limiter 5b17 by subtracting fixed value Δ from voltage correction value Vncorr. Adder 5b7 generates an output upper limit value of integrator 5b15 by adding fixed value $\Delta i$ to voltage correction value Vncorr. Subtractor 5b8 generates an output lower limit value of integrator 5b15 by subtracting fixed value $\Delta i$ from voltage correction value Vncorr. In order to prevent wind-up phenomena, fixed value $\Delta i$ should be smaller than fixed value $\Delta$.

[Details of Operation of Circulating Current Control Portion 5b]

A detailed operation of circulating current control portion 5b will now be described. Though generation of voltage command value Vpref2 for positive-side cell group 6c is mainly described below, similar description is applicable also to generation of voltage command value Vnref2 for negative-side cell group 6d.

Circulating current value Icc (Iccu of the U phase, Iccv of the V phase, and Iccw of the W phase) operated by current operation portion 5a is sent to circulating current control portion 5b. Circulating current control portion 5b subjects the circulating current value to feedback control such that the circulating current value matches with a circulating current command value.

Specifically, initially, subtractor 5b9 calculates a difference between circulating current value Ice and circulating current command value Iccref. The difference between circulating current Icc and command value Iccref thereof is amplified (multiplied by a proportional constant) by gain circuit 5b10 and subjected to time integration by integrator 5b11. Upper and lower limit values of the output from integrator 5b11 are restricted based on positive-side voltage correction value Vpcorr, and a value within a range of Vpcorr$\pm\Delta i$ is output.

Figure 12:
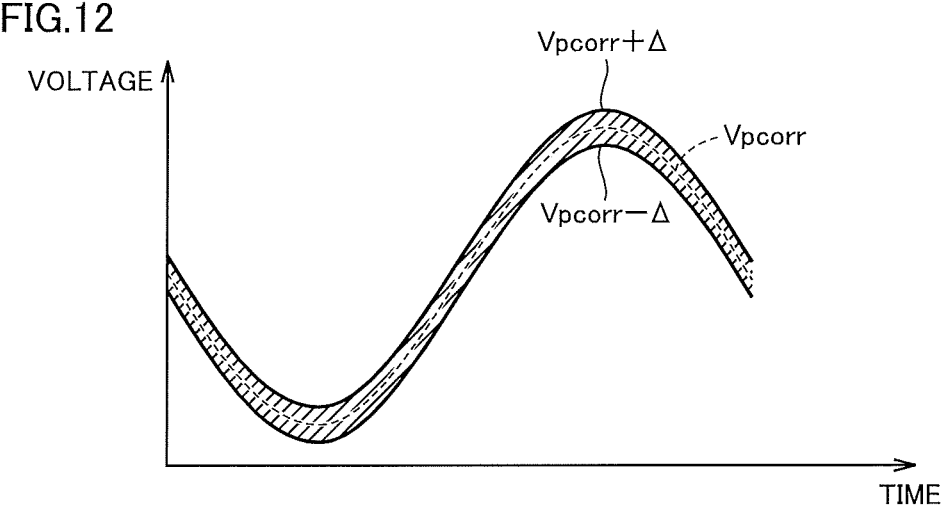
FIG. 12 is a diagram schematically showing a waveform showing change over time of a voltage command value Vpref2 output from circulating current control portion 5b.

FIG. 12 is a diagram schematically showing a waveform showing change over time of voltage command value Vpref2 output from circulating current control portion 5b. As shown in FIG. 12, circulating current control portion 5b outputs a value within a range of Vpcorr$\pm\Delta i$ (a hatched region in FIG. 12) as voltage command value Vpref2.

When the difference between circulating current Ice and command value Iccref thereof is zero, an output from gain circuit 5b10 is also zero and hence adder 5b12 outputs a value around positive-side voltage correction value Vpcorr. With this operation, active power output from cell group 6c or input to cell group 6c is 0, and therefore a voltage of DC capacitor 1e in each cell 1 constituting cell group 6c is maintained at a constant value.

When the difference between circulating current Icc and command value Iccref thereof increases, gain circuit 5b10 outputs a value obtained by amplifying the difference so that circulating current control portion 5b operates to suppress the difference. In this operation, an output from compensator 5b18p is restricted by Vpcorr$\pm\Delta$. By preventing the wind-up phenomena by setting a condition of $\Delta>\Delta i$, the output from gain circuit 5b10 is reliably reflected on voltage command value Vpref2 for positive-side cell group 6c. The difference in circulating current can thus be suppressed. By including integrator 5b11 in compensator 5b18p, variation in voltage caused by a resistive loss in reactors 7a and 7b can be compensated for.

Effect of Fifth Embodiment

The power conversion device according to the fifth embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device, as in the first embodiment. With cell groups 6a and 6b, an electric quantity of each of AC terminals Nu, Nv, and Nw and DC terminals Np and Nn can reliably be controlled without interference by control of a circulating current.

The power conversion device according to the fifth embodiment can control a circulating current value in accordance with a circulating current command value by including cell groups 6c and 6d for control of a circulating current. Circulating current control portion 5b performs an operation on a difference between circulating current Icc and command value Iccref thereof by using proportional integral compensators 5b18p and 5b18n and outputs from compensators 5b18p and 5b18n are restricted by limiters 5b13 and 5b17 to be around voltage correction values Vpcorr and Vncorr. By controlling cell groups 6c and 6d with voltage command values Vpref2 and Vnref2 thus generated, a circulating current can be controlled while a voltage of the DC capacitor in each cell is maintained at a constant value. Integrators 5b11 and 5b15 constituting compensators 5b18p and 5b18n can suppress variation in voltage due to a resistive loss in reactors 7a and 7b.

[Modification]

In the embodiment above, an example in which each cell 1 constituting cell groups 6a and 6b which are not for control of a circulating current and each cell 1 constituting cell groups 6c and 6d for control of a circulating current are identical in configuration is shown. Unlike this configuration, each cell constituting cell groups 6a and 6b and each cell constituting cell groups 6c and 6d may be different in configuration from each other. An effect the same as above is achieved also in this case.

In each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portion 5n, adders 5b1 and 5b3, subtractors 5b2 and 5b4, compensator 5b18p, and limiter 5b13 associated therewith are not required either, which is advantageous in simplification of the configuration of control device 5. Similarly, when only reactor 7a on the positive side is provided, negative-side cell group 6d for control of a circulating current is not required and gate control portion 5o, adders 5b5 and 5b7, subtractors 5b6 and 5b8, compensator 5b18n, and limiter 5b17 associated therewith are not required either, which is advantageous in simplification of the configuration of control device 5.

In each leg circuit 8 in FIG. 1, cell groups 6c and 6d alone can also be provided without providing cell groups 6a and 6b. In this case, gate control portions 5k and 5m in FIG. 3 are not required either. According to such a configuration, circulating current control portion 5b generates voltage command values Vpref2 and Vnref2 for controlling output voltages from cell groups 6c and 6d through a non-linear operation (specifically by integrator 5b11 with a limiter and limiter 5b13) of voltage command values Vpref and Vnref for controlling electric quantities of AC terminals Nu, Nv, and Nw and electric quantities of DC terminals Np and Nn and voltage command value Vccref for control of a circulating current. When voltage command values Vpref2 and Vnref2 for cell groups 6c and 6d are generated through linear combination between voltage command values Vpref and Vnref and voltage command value Vccref, control of a circulating current and control of the electric quantities of the AC terminal and the DC terminal may interfere with each other. In contrast, by generating voltage command values Vpref2 and Vnref2 for cell groups 6c and 6d only through a non-linear operation of voltage command values Vpref and Vnref and voltage command value Vccref (that is, without using linear combination), control of a circulating current and control of the electric quantities of the AC terminal and the DC terminal can both be achieved.

Sixth Embodiment

[Configuration of Power Conversion Device]

Figure 13:
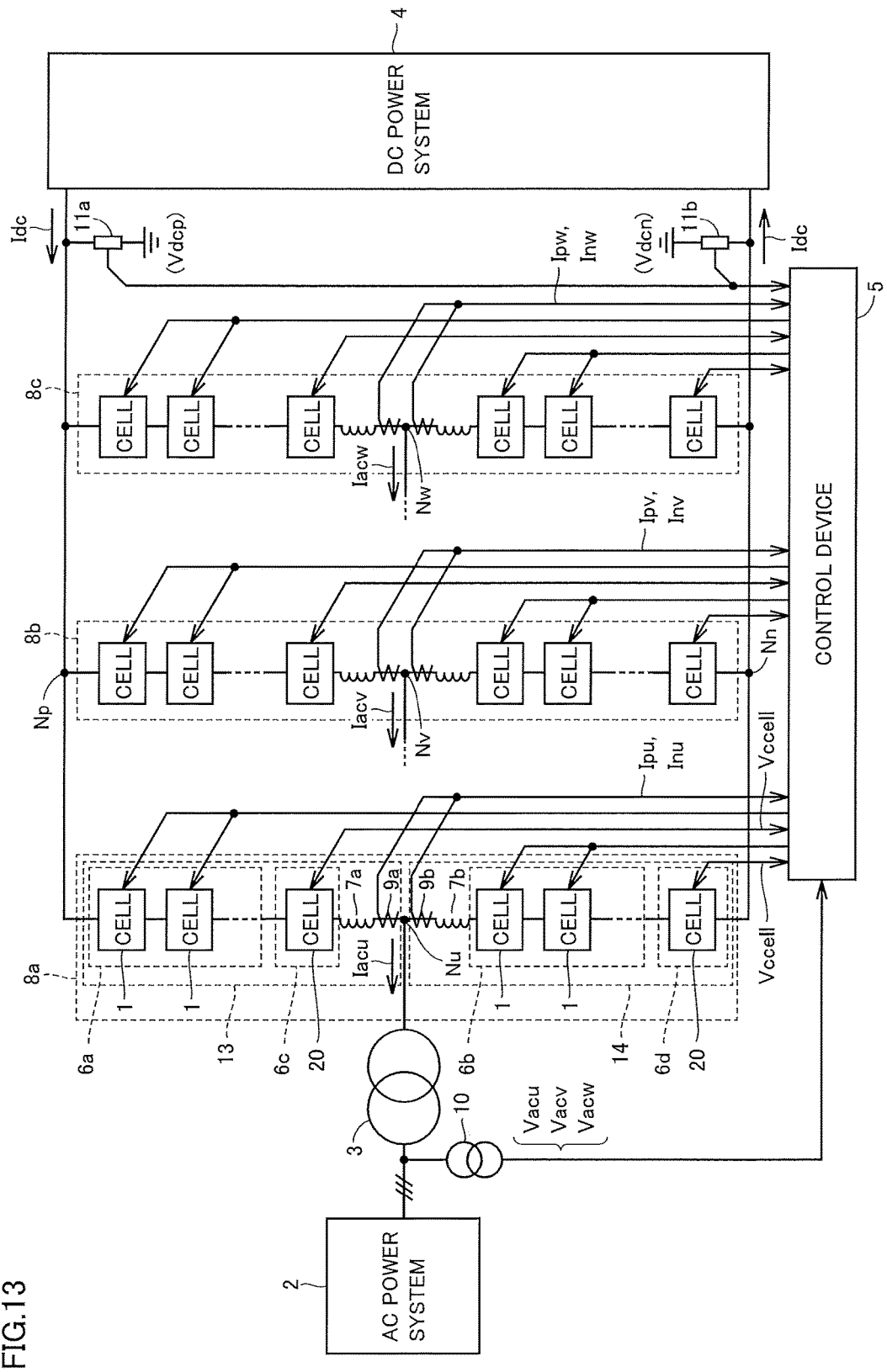
FIG. 13 is a schematic configuration diagram of a power conversion device according to a sixth embodiment.

FIG. 13 is a schematic configuration diagram of a power conversion device according to a sixth embodiment. The power conversion device in FIG. 13 is different from the power conversion device in FIG. 1 in configuration of each cell 20 provided in cell groups 6c and 6d for control of a circulating current. Specifically, each converter cell 20 provided in cell groups 6c and 6d in FIG. 13 is configured to detect a voltage of DC capacitor 1e (which is hereinafter referred to as a cell capacitor voltage Vccell) provided in the converter cell itself and to transmit a detection value to control device 5. Since FIG. 13 is otherwise the same in configuration as FIG. 1, description will not be repeated.

Figure 14:
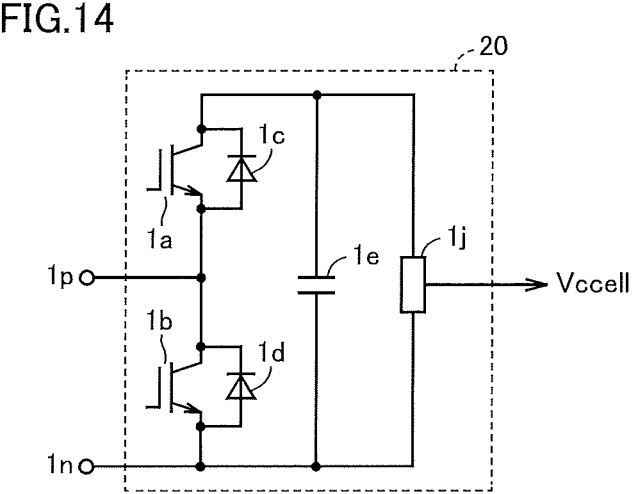
FIG. 14 is a circuit diagram showing a detailed configuration of each cell 20 provided in cell groups 6c and 6d for control of a circulating current.

FIG. 14 is a circuit diagram showing a detailed configuration of each cell 20 provided in cell groups 6c and 6d for control of a circulating current. FIG. 14 shows exemplary cell 20 of a half bridge type.

Referring to FIG. 14, converter cell 20 is different from converter cell 1 in FIG. 2(a) in further including a DC voltage detector 1j provided in parallel to DC capacitor 1e. DC voltage detector 1j detects voltage Vccell of DC capacitor 1e and outputs detected cell capacitor voltage Vccell to control device 5.

Converter cell 20 may be configured as a full bridge in FIG. 2(b) or may be configured with the configuration in FIG. 2(c) being made use of. DC voltage detector 1j is provided in parallel to DC capacitor 1e also in these examples.

[Configuration of Control Device 5]

Figure 15:
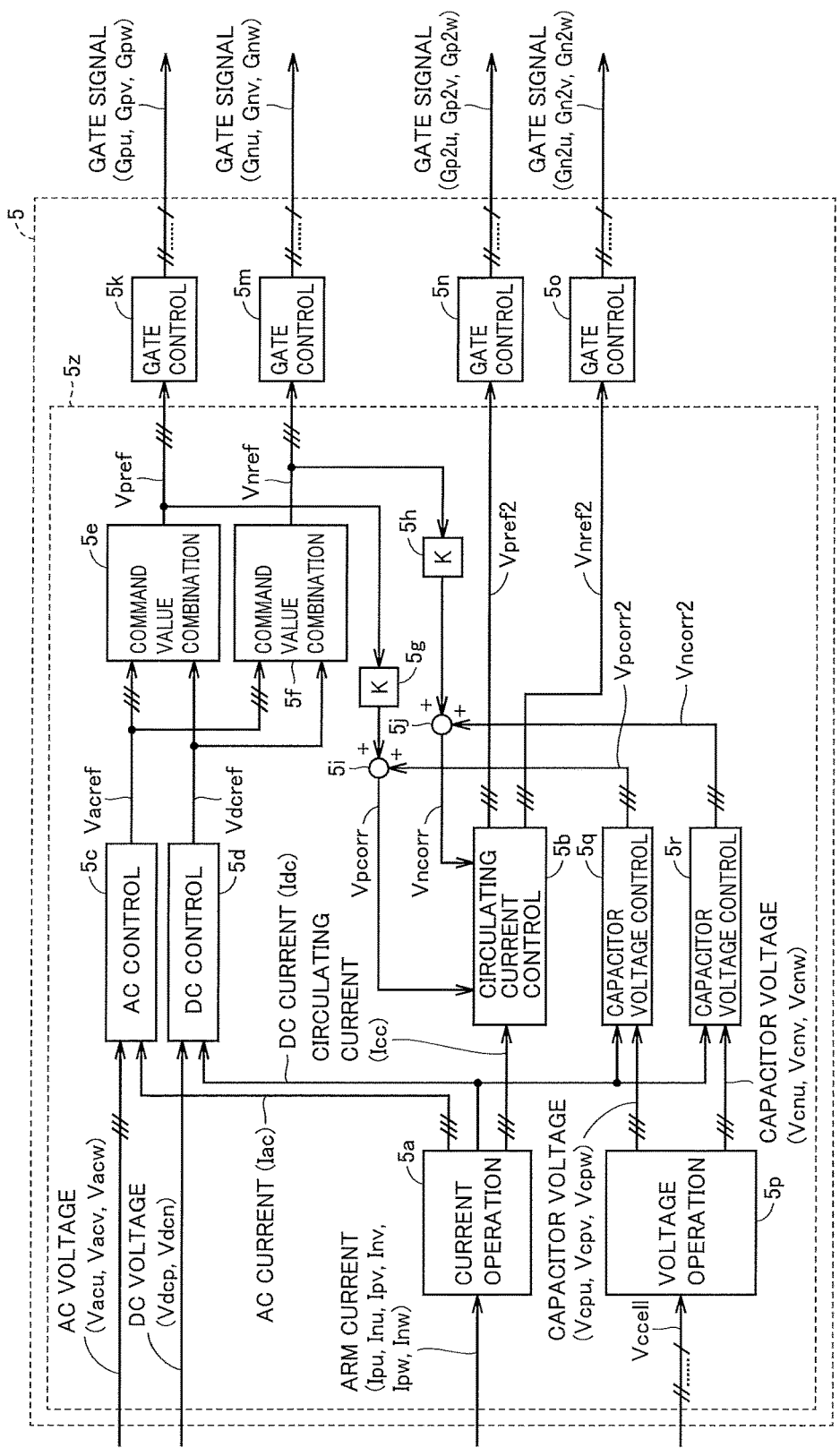
FIG. 15 is a configuration diagram of control device 5 in FIG. 13.

FIG. 15 is a configuration diagram of control device 5 in FIG. 13. Control device 5 shown in FIG. 15 is different from control device 5 in FIG. 3 in further including a voltage operation portion 5p and capacitor voltage control portions 5q and 5r. Since FIG. 15 is otherwise the same in configuration as FIG. 13, elements the same as those or elements corresponding to those in FIG. 13 have the same reference characters allotted and description may not be repeated below.

Voltage operation portion 5p receives information on cell capacitor voltage Vccell from each cell 20 provided in cell groups 6c and 6d of leg circuits 8a, 8b, and 8c of the respective phases shown in FIG. 13. Voltage operation portion 5p calculates a representative value Vcp (Vcpu of the U phase, Vcpv of the V phase, and Vcpw of the W phase) of a plurality of cell capacitor voltages of positive-side cell group 6c for each of the U phase, the V phase, and the W phase based on received information on cell capacitor voltage Vccell and calculates a representative value Vcn (Vcnu of the U phase, Vcnv of the V phase, and Vcnw of the W phase) of a plurality of cell capacitor voltages of negative-side cell group 6d. An average value, a median, a maximum value, or a minimum value of cell capacitor voltages Vccell of each cell group can be applied as appropriate to operation of the representative value. Voltage operation portion 5p outputs representative values Vcpu, Vcpv, and Vcpw of the cell capacitor voltages of each positive-side cell group 6c to capacitor voltage control portion 5q and representative values Vcnu, Vcnv, and Vcnw of the cell capacitor voltages of each negative-side cell group 6d to capacitor voltage control portion 5r.

Capacitor voltage control portion 5q receives information on DC current value Idc from current operation portion 5a and receives information on cell capacitor voltage values Vcpu, Vcpv, and Vcpw of positive-side cell group 6c from voltage operation portion 5p. Capacitor voltage control portion 5q generates a voltage correction value Vpcorr2 on which voltage command value Vpref2 for positive-side cell group 6c is based based on the received information and outputs generated voltage correction value Vpcorr2 to adder 5i.

Capacitor voltage control portion 5r receives information on DC current value Idc from current operation portion 5a and receives information on cell capacitor voltage values Vcnu, Vcnv, and Vcnw of negative-side cell group 6d from voltage operation portion 5p. Capacitor voltage control portion 5r generates a voltage correction value Vncorr2 on which voltage command value Vnref2 for negative-side cell group 6d is based based on the received information and outputs generated voltage correction value Vncorr2 to adder 5j.

Adder 5i adds a value in proportion to voltage command value Vpref for positive-side cell group 6a (a value multiplied by gain K by gain circuit 5g) and voltage correction value Vpcorr2 output from capacitor voltage control portion 5q to each other and outputs a result of addition as final voltage correction value Vpcorr to circulating current control portion 5b. Similarly, adder 5j adds a value in proportion to voltage command value Vnref for negative-side cell group 6b (a value multiplied by gain K by gain circuit 5h) and voltage correction value Vncorr2 output from capacitor voltage control portion 5r to each other and outputs a result of addition to circulating current control portion 5b as final voltage correction value Vncorr.

A configuration in any of FIGS. 4, 6, 8, 9, and 11 may be applied to circulating current control portion 5b in the sixth embodiment.

[Detailed Operation of Control Device 5]

A detailed operation of control device 5 will now be described. Description of an operation in common to that in FIG. 3 in the first embodiment will not be repeated.

Since voltages output from cell groups 6c and 6d for control of a circulating current have a function to control a current which flows through reactors 7a and 7b, power output from cell groups 6c and 6d is substantially reactive power. When active power originating from a loss in reactors 7a and 7b is unignorable, however, active power should be supplied to cell groups 6c and 6d, because the method described in the first embodiment, that is, the method of providing only a value in proportion to voltage command values Vpref and Vnref provided to cell groups 6a and 6b to circulating current control portion 5b as voltage correction values Vpcorr and Vncorr alone, cannot maintain a voltage of DC capacitor 1e of cell groups 6c and 6d at a constant value.

From a point of view above, in the power conversion device in FIGS. 13 and 15, voltage detector 1j detects a voltage of DC capacitor 1e of each cell 20 constituting each of cell groups 6c and 6d. Voltage operation portion 5p operates representative values Vcpu, Vcpv, Vcpw, Vcnu, Vcnv, and Vcnw of cell capacitor voltages Vccell (which are simply referred to as capacitor voltage values for the sake of brevity) of each of cell groups 6c and 6d. A compensator provided in each of capacitor voltage control portions 5q and 5r amplifies a difference between a capacitor voltage command value and a capacitor voltage value (that is, a command value−a voltage value) for each of cell groups 6c and 6d of each phase. Voltage control portions 5q and 5r output a result of multiplication of the amplified difference by a polarity (1 or −1) of DC current value Idc to adders 5i and 5j as voltage correction values Vpcorr2 and Vncorr2.

Adder 5i adds voltage command value Vccref for control of a circulating current, a value in proportion to voltage command value Vpref for cell group 6a, and voltage correction value Vpcorr to one another. A result of addition is supplied to gate control portion 5n as voltage command value Vpref2 for cell group 6c. Adder 5j adds voltage command value Vccref for control of a circulating current, a value in proportion to voltage command value Vnref for cell group 6b, and voltage correction value Vncorr to one another. A result of addition is supplied to gate control portion 5o as voltage command value Vnref2 for cell group 6d.

According to the configuration, (i) when DC current value Idc is positive (polarity=1) and a capacitor voltage is smaller than a command value thereof, the compensator provided in each of capacitor voltage control portions 5q and 5r outputs a positive signal. Therefore, voltage correction values Vpcorr2 and Vncorr2 obtained by multiplication of the output from the compensator by the polarity (=1) of DC current Idc serves as a signal having a positive DC component. With a signal of this voltage correction value, a period during which switching element 1a in FIG. 5 is conducting is longer and hence a period during which DC current Idc flows into DC capacitor 1e is longer. Consequently, DC capacitor 1e is charged, and therefore a difference between the capacitor voltage command value and a detection value of the capacitor voltage is eliminated.

(ii) When DC current value Idc is positive (polarity=1) and a capacitor voltage is greater than a command value thereof, the compensator provided in each of capacitor voltage control portions 5q and 5r outputs a negative signal. Therefore, voltage correction values Vpcorr2 and Vncorr2 obtained by multiplication of the output from the compensator by the polarity (=1) of DC current Idc serves as a signal having a negative DC component. With a signal of this voltage correction value, a period during which switching element 1a in FIG. 5 is conducting is shorter and therefore a difference between the capacitor voltage command value and a detection value of the capacitor voltage is eliminated.

(iii) When DC current value Idc is negative (polarity=−1) and a capacitor voltage is smaller than a command value thereof, the compensator provided in each of capacitor voltage control portions 5q and 5r outputs a positive signal. Therefore, voltage correction values Vpcorr2 and Vncorr2 obtained by multiplication of the output from the compensator by the polarity (=−1) of DC current Idc serves as a signal having a negative DC component. With the signal of this voltage correction value, a period during which switching element 1a in FIG. 5 is conducting is shorter and therefore a period during which DC current Idc flows out of DC capacitor 1e is shorter. Consequently, since a time period of discharging of DC capacitor 1e decreases (charged), a difference between the capacitor voltage command value and a detection value of the capacitor voltage is eliminated.

(iv) When DC voltage value Idc is negative (polarity=−1) and a capacitor voltage is greater than a command value thereof, the compensator provided in each of capacitor voltage control portions 5q and 5r outputs a negative signal. Therefore, voltage correction values Vpcorr2 and Vncorr2 obtained by multiplication of the output from the compensator by the polarity (=−1) of DC current Idc serves as a signal having a positive DC component. With the signal of this voltage correction value, a period during which switching element 1a in FIG. 5 is conducting is longer and therefore a time period of discharging of DC capacitor 1e is longer. Therefore, a difference between the capacitor voltage command value and a detection value of the capacitor voltage is eliminated.

Effect of Sixth Embodiment

The power conversion device according to the sixth embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device as in the first embodiment. With cell groups 6a and 6b, an electric quantity of each of AC terminals Nu, Nv, and Nw and DC terminals Np and Nn can reliably be controlled without interference by control of a circulating current.

Furthermore, the power conversion device according to the sixth embodiment can control a value of a circulating current in accordance with a circulating current command value by including cell groups 6c and 6d for control of a circulating current. The voltage command values are generated through a non-linear operation of voltage command values Vpref and Vnref for controlling cell groups 6a and 6b, voltage command value Vccref for control of a circulating current, and voltage correction values Vpcorr2 and Vncorr2 based on a cell capacitor voltage. Consequently, a circulating current can be suppressed while active power input to or output from each cell 20 in cell groups 6c and 6d is set to zero. In particular, since control is based on the cell capacitor voltage, a voltage of the DC capacitor can be maintained constant even though a loss in the reactor and/or variation in electric quantity occur(s).

[Modification]

As in the first embodiment, in each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portion 5n, adder 5i, gain circuit 5g, and capacitor voltage control portion 5q associated therewith are not required either, which is advantageous in simplification of the configuration of control device 5. Similarly, when only reactor 7a on the positive side is provided, negative-side cell group 6d for control of a circulating current is not required and gate control portion 5o, adder 5j, gain circuit 5h, and capacitor voltage control portion 5r associated therewith are not required either, which is advantageous in simplification of the configuration of control device 5.

Though an example in which capacitor voltage control portions 5q and 5r multiply an output from the compensator by a polarity of DC current value Idc is shown in the embodiment above, the same effect is achieved also by multiplying the output from the compensator by DC current value Idc itself instead of the polarity of DC current value Idc. When DC control portion 5d carries out feedback control based on a difference between a DC current command value and DC current value Idc, the same effect is achieved also by multiplying the output from the compensator by a DC current command value instead of a polarity of DC current value Idc. The same effect is obtained also by multiplying an output from the compensator of each phase by an AC current value of each phase (Iacu of the U phase, Iacv of the V phase, and Iacw of the W phase) or a polarity thereof instead of a polarity of DC current value Idc in capacitor voltage control portion 5q. The same effect is obtained also by multiplying an output from the compensator of each phase by an AC current value opposite in polarity of each phase (−Iacu of the U phase, −Iacv of the V phase, and −Iacw of the W phase) or a polarity thereof in capacitor voltage control portion 5r.

In each leg circuit 8 in FIG. 13, cell groups 6c and 6d alone can also be provided without providing cell groups 6a and 6b. In this case, gate control portions 5k and 5m in FIG. 15 are not required either. According to such a configuration, circulating current control portion 5b generates voltage command values Vpref2 and Vnref2 for controlling output voltages from cell groups 6c and 6d through a non-linear operation of voltage command values Vpref and Vnref for control of electric quantities of AC terminals Nu, Nv, and Nw and electric quantities of DC terminals Np and Nn, voltage command value Vccref for control of a circulating current, and voltage correction values Vpcorr2 and Vncorr2 based on a cell capacitor voltage. When voltage command values Vpref2 and Vnref2 for cell groups 6c and 6d are generated through linear combination between voltage command values Vpref and Vnref and voltage command value Vccref, control of a circulating current and control of electric quantities of the AC terminal and the DC terminal may interfere with each other. In contrast, by generating voltage command values Vpref2 and Vnref2 for cell groups 6c and 6d only through a non-linear operation of voltage command values Vpref and Vnref and voltage command value Vccref (that is, without using linear combination), control of a circulating current and control of electric quantities of the AC terminal and the DC terminal can both be achieved.

Seventh Embodiment

Though a power conversion device in a seventh embodiment is the same as the sixth embodiment shown in FIG. 13 in overall configuration, control device 5 is different in part from FIG. 15 in the sixth embodiment in configuration and operations. Specific description will be given below with reference to FIGS. 13 and 16.

[Configuration of Control Device 5]

Figure 16:
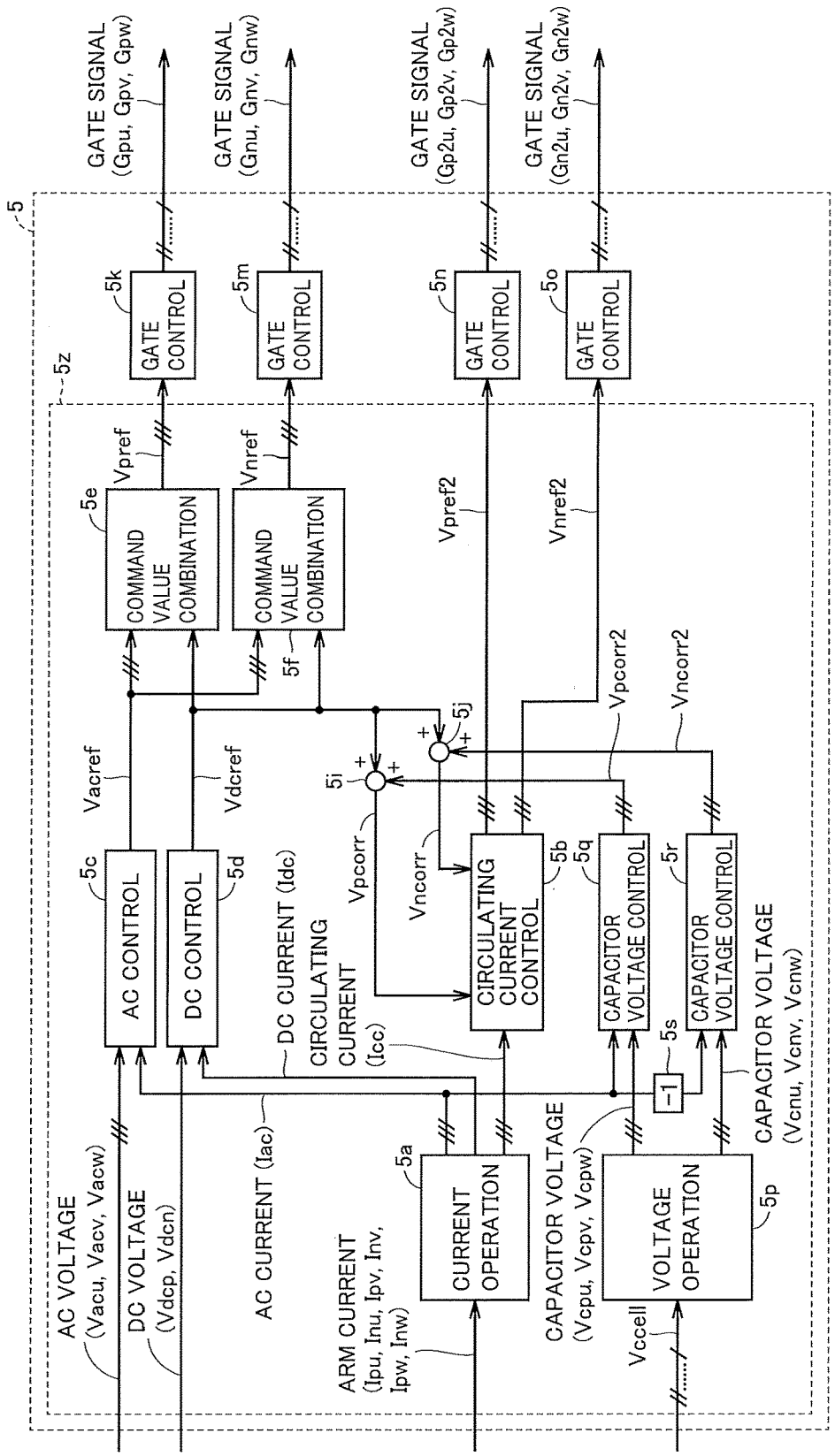
FIG. 16 is a configuration diagram of control device 5 included in the power conversion device according to a seventh embodiment.

FIG. 16 is a configuration diagram of control device 5 included in the power conversion device according to the seventh embodiment. Control device 5 in FIG. 16 is different from control device 5 in FIG. 15 in that DC voltage command value Vdcref output from DC control portion 5d is input to each of adders 5i and 5j instead of values in proportion to voltage command values Vpref and Vnref. Control device 5 in FIG. 16 is different from control device 5 in FIG. 15 in that AC current values Iacu, Iacv, and Iacw instead of DC current value Idc are input to capacitor voltage control portion 5q. Control device 5 in FIG. 16 is further different from control device 5 in FIG. 15 in that AC current values −Iacu, −Iacv, and −Iacw opposite in polarity which are obtained by multiplication by −1 by a gain circuit 5s instead of DC current value Idc are input to capacitor voltage control portion 5r. Since FIG. 16 is otherwise the same in configuration as FIG. 15, elements the same as those or corresponding to those in FIG. 15 have the same reference characters allotted and description may not be repeated below.

[Operation of Control Device 5]

An operation of control device 5 in FIG. 16 will now be described. Description of an operation in common to that in FIG. 3 in the first embodiment and FIG. 15 in the sixth embodiment will not be repeated.

Voltage command value Vccref for control of a circulating current output from circulating current control portion 5b (Vccrefu of the U phase, Vccrefv of the V phase, and Vccrefw of the W phase) is a signal having a polarity of both of positive and negative. Therefore, when converter cell 20 constituting cell groups 6c and 6d is configured as a half bridge as shown in FIG. 2(a) or 14, a bias is required for a voltage command value. In the seventh embodiment, the bias is set to DC voltage command value Vdcref output from DC control portion 5d.

Capacitor voltage control portion 5q generates voltage correction values Vpcorr2u, Vpcorr2v, and Vpcorr2w by amplifying a difference between capacitor voltage values Vcpu, Vcpv, and Vcpw and a capacitor voltage command value for each phase and multiplying the amplified difference by AC current values Iacu, Iacv, and Iacw, respectively. Similarly, capacitor voltage control portion 5r generates voltage correction values Vncorr2u, Vncorr2v, and Vncorr2w for control of a circulating current by amplifying a difference between capacitor voltage values Vcnu, Vcnv, and Vcnw and a capacitor voltage command value for each phase and multiplying the amplified difference by AC current values −Iacu, −Iacv, and −Iacw opposite in polarity, respectively.

When a DC current flows in cell groups 6c and 6d, active power is generated in each cell 20 constituting cell groups 6c and 6d in accordance with DC voltage command value Vdcref representing a DC value and consequently DC capacitor 1e of each cell 20 is charged or discharges. When a difference is thus produced between the voltage of DC capacitor 1e and the capacitor voltage command value, capacitor voltage control portions 5q and 5r generate voltage correction values Vpcorr2 and Vncorr2 by amplifying the difference and multiplying the difference by an AC current value (or an AC current value opposite in polarity). Voltage correction values Vpcorr2 and Vncorr2 serve for control of each cell 20 in cell groups 6c and 6d so as to output an AC voltage in phase with (or opposite in phase to) the AC current. As each cell 20 generates an AC voltage in accordance with voltage correction values Vpcorr and Vncorr, the generated AC voltage is applied to an AC current which actually flows and hence active power is generated. As AC active power and DC power are balanced, a difference between a voltage value of DC capacitor 1e of each cell 20 and the capacitor voltage command value decreases and the DC capacitor voltage is subjected to feedback control so as to match with the capacitor voltage command value.

Effect of Seventh Embodiment

The power conversion device according to the seventh embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device as in the sixth embodiment. With cell groups 6a and 6b, an electric quantity of each of AC terminals Nu, Nv, and Nw and DC terminals Np and Nn can reliably be controlled without interference by control of a circulating current.

Furthermore, the power conversion device according to the seventh embodiment can control a value of a circulating current in accordance with a circulating current command value by including cell groups 6c and 6d for control of a circulating current. The voltage command values are generated through a non-linear operation of DC voltage command value Vdcref for controlling electric quantities of DC terminals Np and Nn, voltage command value Vccref for control of a circulating current, and voltage correction values Vpcorr2 and Vncorr2 based on a cell capacitor voltage. Consequently, a circulating current can be suppressed while active power input to or output from each cell 20 in cell groups 6c and 6d is set to zero. In particular, since control is based on the cell capacitor voltage, a voltage of the DC capacitor can be maintained constant even though a loss in the reactor and/or variation in electric quantity occur(s).

[Modification]

As in the first embodiment, in each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portion 5n, adder 5i, and capacitor voltage control portion 5q associated therewith are not required either, which is advantageous in simplification of the configuration of control device 5. Similarly, when only reactor 7a on the positive side is provided, negative-side cell group 6d for control of a circulating current is not required and gate control portion 5o, adder 5j, and capacitor voltage control portion 5r associated therewith are not required either, which is advantageous in simplification of the configuration of control device 5.

In the embodiment, the same effect is achieved also when a signal input to adders 5i and 5j is set to a constant bias value instead of DC voltage command value Vdcref.

It should be understood that the embodiments disclosed herein are illustrative and non-restrictive in every respect. The scope of this invention is defined by the terms of the claims rather than the description above and is intended to include any modifications within the scope and meaning equivalent to the terms of the claims.

REFERENCE SIGNS LIST

1, 20 converter cell; 1a, 1b, 1f, 1g switching element; 1c, 1d, 1h, 1i diode; 1e DC capacitor; 1j, 11a, 11b DC voltage detector; 1n, 1p input and output terminal; 2 AC circuit; 3 interconnected transformer; 4 DC circuit; 5 control device; 5a current operation portion; 5b circulating current control portion; 5b18, 5b18p, 5b18n compensator; 5b20, 5b21 multiplier; 5b22 non-linear transfer function application portion; 5b25 non-linear mathematical function application portion; 5b13, 5b17 limiter; 5b11, 5b15 integrator; 5c AC control portion; 5d DC control portion; 5e, 5f command value combination portion; 5k, 5m, 5n, 5o gate control portion; 5p voltage operation portion; 5q, 5r capacitor voltage control portion; 5z voltage command value generation portion; 6a, 6c positive-side cell group; 6b, 6d negative-side cell group; 7a, 7b reactor; 8, 8a, 8b, 8c leg circuit; 9a, 9b arm current detector; 10 AC voltage detector; 13 positive-side arm; 14 negative-side arm; Icc circulating current; Idc DC current; Iac AC current; Idc DC current value; Inu, Inv, Inw, Ipu, Ipv, Ipw arm current; K proportional gain; Nn negative-side DC terminal; Np positive-side DC terminal; Nu, Nv, Nw AC terminal (AC connection portion); and Vdc value of voltage across DC terminals

The invention claimed is:

1. A power conversion device which converts power between a DC circuit and an AC circuit, the power conversion device comprising:
a plurality of leg circuits which correspond to respective phases of the AC circuit and are connected in parallel between common first and second DC terminals, each leg circuit including:
a plurality of converter cells cascaded to one another and each including an energy storage; and
at least one inductor connected in series to the plurality of converter cells; and
a control device which controls operations of the plurality of converter cells,
the control device including:
an AC control portion which generates a first voltage command value representing an AC voltage component to be output from the plurality of converter cells for each leg circuit based on an AC current and an AC voltage of the AC circuit;
a DC control portion which generates a second voltage command value representing a DC voltage component to be output from the plurality of converter cells for each leg circuit based on a DC current and a DC voltage of the DC circuit; and
a circulating current control portion which generates a third voltage command value representing a voltage to be output from the plurality of converter cells in order to suppress a circulating current for each leg circuit based on the circulating current which circulates through each leg circuit,
the circulating current control portion performing a non-linear operation with the first, second, and third voltage command values,
the plurality of converter cells of each leg circuit operating in accordance with a result of the non-linear operation.

2. The power conversion device according to claim 1, wherein:
each leg circuit is divided into a first arm on a high potential side and a second arm on a low potential side with a connection portion electrically connected to a corresponding phase of the AC circuit being interposed;
the circulating current control portion generates a second value by multiplying a first value by a value calculated by adding a fixed value to the third voltage command value, the first value being obtained by subtracting the first voltage command value from the second voltage command value;
the plurality of converter cells constituting the first arm operate in accordance with the second value;
the circulating current control portion generates a fourth value by multiplying a third value by a value calculated by adding a fixed value to the third voltage command value, the third value being obtained by adding the first voltage command value to the second voltage command value; and
the plurality of converter cells constituting the second arm operate in accordance with the fourth value.

3. The power conversion device according to claim 2, wherein:
the energy storage is a capacitor;
the control device further includes a first capacitor voltage control portion which generates a first voltage correction value based on a difference between a representative value of a capacitor voltage of the plurality of converter cells constituting the first arm and a command value of the capacitor voltage through feedback control to decrease the difference;

the circulating current control portion generates the second value with the first value corrected by linear combination with the first voltage correction value;

the control device further includes a second capacitor voltage control portion which generates a second voltage correction value based on a difference between a representative value of a capacitor voltage of the plurality of converter cells constituting the second arm and a command value of the capacitor voltage through feedback control to decrease the difference; and the circulating current control portion generates the fourth value using the third value corrected by linear combination with the second voltage correction value.

4. The power conversion device according to claim 3, wherein:

the first capacitor voltage control portion generates the first voltage correction value by multiplying the difference between the representative value of the capacitor voltage of the plurality of converter cells constituting the first arm and the command value of the capacitor voltage by a DC current value of the DC circuit or a polarity of the DC current value; and the second capacitor voltage control portion generates the second voltage correction value by multiplying the difference between the representative value of the capacitor voltage of the plurality of converter cells constituting the second arm and the command value of the capacitor voltage by the DC current value of the DC circuit or the polarity of the DC current value.

5. The power conversion device according to claim 3, wherein:

the first capacitor voltage control portion generates the first voltage correction value by multiplying the difference between the representative value of the capacitor voltage of the plurality of converter cells constituting the first arm and the command value of the capacitor voltage by an AC current value of the AC circuit or a polarity of the AC current value; and the second capacitor voltage control portion generates the second voltage correction value by multiplying the difference between the representative value of the capacitor voltage of the plurality of converter cells constituting the second arm and the command value of the capacitor voltage by an AC current value obtained by inverting a polarity of the AC current value of the AC circuit or a polarity reverse to the polarity of the AC current value.

6. The power conversion device according to claim 1, wherein:

each leg circuit is divided into a first arm on a high potential side and a second arm on a low potential side with a connection portion electrically connected to a corresponding phase of the AC circuit being interposed;

the circulating current control portion generates a second value by adding a first value to a value calculated by applying a non-linear transfer function to the third voltage command value, the first value being obtained by subtracting the first voltage command value from the second voltage command value;

the plurality of converter cells constituting the first arm operate in accordance with the second value;

the circulating current control portion generates a fourth value by adding a third value to a value calculated by applying a non-linear transfer function to the third voltage command value, the third value being obtained by adding the first voltage command value to the second voltage command value;

the plurality of converter cells constituting the second arm operate in accordance with the fourth value; and the non-linear transfer function is configured such that a ratio of an output to an input increases when the input exceeds a threshold value.

7. The power conversion device according to claim 1, wherein:

each leg circuit is divided into a first arm on a high potential side and a second arm on a low potential side with a connection portion electrically connected to a corresponding phase of the AC circuit being interposed;

the circulating current control portion generates a second value by adding a first value to a value obtained by applying a non-linear mathematical function to the third voltage command value, the first value being obtained by subtracting the first voltage command value from the second voltage command value;

the plurality of converter cells constituting the first arm operate in accordance with the second value;

the circulating current control portion generates a fourth value by adding a third value to a value obtained by applying a non-linear mathematical function to the third voltage command value, the third value being obtained by adding the first voltage command value to the second voltage command value;

the plurality of converter cells constituting the second arm operate in accordance with the fourth value; and the non-linear mathematical function is configured such that a ratio of an output to an input increases with increase in magnitude of input.

8. The power conversion device according to claim 1, wherein:

each leg circuit is divided into a first arm on a high potential side and a second arm on a low potential side with a connection portion electrically connected to a corresponding phase of the AC circuit being interposed;

the circulating current control portion generates a second value by applying a first non-linear mathematical function to the third voltage command value and a first value, the first value being obtained by subtracting the first voltage command value from the second voltage command value;

the plurality of converter cells constituting the first arm operate in accordance with the second value;

the circulating current control portion generates a fourth value by applying a second non-linear mathematical function to the third voltage command value and a third value, the third value being obtained by adding the first voltage command value to the second voltage command value;

the plurality of converter cells constituting the second arm operate in accordance with the fourth value; and each of the first and second non-linear mathematical functions is configured such that a value of an output with respect to each input increases with increase in magnitude of each input and the value of the output is restricted within a determined range.

9. The power conversion device according to claim 1, wherein:

each leg circuit is divided into a first arm on a high potential side and a second arm on a low potential side with a connection portion electrically connected to a corresponding phase of the AC circuit being interposed;

the circulating current control portion generates a second value by restricting the third voltage command value with a first upper limit value and a first lower limit value, the first upper limit value being calculated by adding a first fixed value to a first value obtained by subtracting the first voltage command value from the second voltage command value, and the first lower limit value being calculated by subtracting the first fixed value from the first value;

the plurality of converter cells constituting the first arm operate in accordance with the second value;

the circulating current control portion generates a fourth value by restricting the third voltage command value with a second upper limit value and a second lower limit value, the second upper limit value being calculated by adding a second fixed value to a third value obtained by adding the first voltage command value to the second voltage command value, and the second lower limit value being calculated by subtracting the second fixed value from the third value; and the plurality of converter cells constituting the second arm operate in accordance with the fourth value.

10. A power conversion device which converts power between a DC circuit and an AC circuit, the power conversion device comprising:

a plurality of leg circuits which correspond to respective phases of the AC circuit, each leg circuit including a plurality of converter cells each including an energy storage; and a control device which controls operations of the plurality of converter cells, the control device including:
    an AC control portion which generates a first voltage command value based on an AC current and an AC voltage of the AC circuit;
    a DC control portion which generates a second voltage command value based on a DC current and a DC voltage of the DC circuit; and
    a circulating current control portion which generates a third voltage command value based on a circulating current which circulates among the leg circuits,
the circulating current control portion performing a non-linear operation with the first, second, and third voltage command values, and
at least one of the plurality of converter cells operating in accordance with a result of the non-linear operation.

* * * * *